(12) United States Patent
Mohan et al.

(10) Patent No.: US 6,310,964 B1
(45) Date of Patent: Oct. 30, 2001

(54) PRODUCE SIZE RECOGNITION SYSTEM

(75) Inventors: Rakesh Mohan, Stamford, CT (US); Jonathan Hudson Connell, Cortlandt-Manor; Rudolf Maarten Bolle, Bedford Hills, both of NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/428,915

(22) Filed: Oct. 28, 1999

Related U.S. Application Data

(63) Continuation of application No. 08/897,146, filed on Jul. 21, 1997, now Pat. No. 6,005,959, which is a continuation of application No. 08/394,524, filed on Feb. 17, 1995, now abandoned.

(51) Int. Cl.$^7$ ................................................ G06K 9/00
(52) U.S. Cl. ................ 382/110; 382/141; 382/170; 382/199; 382/203; 348/89
(58) Field of Search ................................ 382/110, 141, 382/142, 143, 152, 286, 199, 100, 203, 170, 190; 705/16, 400; 209/538; 399/1; 348/86, 89, 91

(56) References Cited

U.S. PATENT DOCUMENTS

| | | |
|---|---|---|
| 4,550,438 | 10/1985 | Convis . |
| 4,687,107 | 8/1987 | Brown . |
| 4,876,729 | 10/1989 | Watanabe . |
| 5,020,675 * | 6/1991 | Cowlin et al. ................ 209/538 |
| 5,060,290 | 10/1991 | Kelly . |
| 5,157,735 | 10/1992 | Maeda . |
| 5,309,374 | 5/1994 | Misra et al. . |
| 5,321,764 | 6/1994 | Cullen . |
| 5,351,310 | 9/1994 | Califano . |
| 5,506,661 * | 4/1996 | Hanzawa ........................... 399/1 |
| 5,546,475 * | 8/1996 | Bolle et al. ..................... 382/190 |
| 5,751,833 | 5/1998 | Blit et al. . |
| 6,005,959 * | 12/1999 | Mohan et al. .................. 382/110 |

FOREIGN PATENT DOCUMENTS

| | | |
|---|---|---|
| 63-164690 | 7/1988 | (JP) . |
| 1-41076 | 2/1989 | (JP) . |
| 1-204187 | 8/1989 | (JP) . |
| 3-229377 | 10/1991 | (JP) . |
| A-59 027336 | 6/1994 | (JP) . |

OTHER PUBLICATIONS

Webster's II New Riverside University Dictionary 1994.
T. Pavlidis, "A Review of Algorithms for Shape Analysis", Computer Graphics and Image Processing, vol. 7, 1987, pp. 243–258.
A. Rosenfeld, et al., "Digital Picture Processing", Second Edition, vol. 1, pp. 42–49.
B.K.P. Horn, "Robot Vision", The MIT Press, 1986, pp. 46–49, 335–339.
S. Marshall, "Review of Shape Coding Techniques", Image and Vision Computing, vol. 7, No. 4, Nov. 1989, pp. 281–294.
S.H. Mersh, "Polarized Lighting for Machine Applications", Proc. of RI/SME Third Annual Applied Machine Vision Conf., 1984, pp.40–54.

* cited by examiner

Primary Examiner—Joseph Mancuso
Assistant Examiner—Vikkram Bali
(74) Attorney, Agent, or Firm—McGuireWoods, LLP; LouisJ. Percello

(57) ABSTRACT

The present system and apparatus uses image processing to recognize object size within a scene. The system includes novel image processing apparatus and methods to segment one or more object images from a background image of the scene. A processed image (that can be used to characterize size features) of the object(s) is then compared to stored reference images. The object size is recognized when a match occurs. The system can recognize object sizes independent of number of objects present and the objects may be touching each other and overlapping. The system can be trained to recognize object sizes that it was not originally programmed to recognize.

5 Claims, 16 Drawing Sheets

First image · Second Image

First image · Second image 952, horizontal 954, diagonal 956, vertical 958, diagonal

PRODUCE SIZE RECOGNITION SYSTEM

CROSS-REFERENCE TO RELATED APPLICATIONS

This application is a continuation of application Ser. No. 08/897,146, entitled "Produce Size Recognition System," filed on Jul. 21, 1997, by R. Mohan et al., and has now issued as U.S. Pat. No. 6,005,959, which is a continuation of application Ser. No. 08/394,524 filed on Feb. 17, 1995, now abandoned, and assigned to a common assignee, the entire subject matter of which is incorporated herein by reference.

This application is also related to copending applications now issued, entitled "Object Imaging System", U.S. Pat. No. 5,631,976, issued on May 20, 1997, and "Produce Recognition System", U.S. Pat. No. 5,546,475, issued on Aug. 13, 1996, and both assigned to a common assignee, the entire subject matter of which is incorporated herein by reference.

FIELD OF THE INVENTION

This invention relates to the field of determining the size of an object from computerized optical image scanning devices. More specifically, the invention is a trainable system and method relating to recognizing the size of bulk items using image processing.

BACKGROUND OF THE INVENTION

Image processing systems exist in the prior art for estimating the size of objects. Often these systems use binary images to perform this computation. One common method is the use of the zero-th order moment of the binary picture function, or simply put, the number of picture elements that lie within the binary segment.

If the size and orientation of the object in the image is known in advance, which is the case in inspection problems, for example, binary matched filters are commonly used. This method allows for determining with great precision whether a specific object of certain size and shape is present in the image at a certain location.

The prior art often performs these methods to verify that the target object in the image is indeed the object that is expected, and, possibly, to grade/classify the object according to the quality of its appearance relative to its zero order moment or matched filter. An alternative purpose could be to identify the target object by matching the target image object with a number of reference matched filters.

In this description, identifying or measuring the size of one or more objects is defined as determining, given a set of reference sizes, the reference size of the target object. Classifying or grading the size is defined as determining that the target object is of a certain class representing a range of sizes and/or that the size of the object is satisfactory. Here, one of the classes can be a "reject" class, meaning that the size of the target object is not one of the expected values. Verifying, on the other hand, is defined as determining that the target is known to be a certain size and simply verifying this to be true or false. Recognizing is defined as identifying, measuring, classifying, grading, and/or verifying.

A round object, in this description, is an object having every part of the surface or circumference equidistant from the center. Bulk items include any item that is sold in bulk in supermarkets, grocery stores, retail stores or hardware stores.

Examples include produce (fruits and vegetables), sugar, coffee beans, candy, nails, nuts, bolts, general hardware, parts, and package goods.

In image processing, a digital image is an analog image from a camera that is converted to a discrete representation by dividing the picture into a fixed number of locations called picture elements and quantizing the value of the image at those picture elements into a fixed number of values. The resulting digital image can be processed by a computer algorithm to develop other images or characteristics of these images. These images or characteristics can be stored in memory and/or used to determine information about the imaged object. A pixel is a picture element of a digital image.

Image processing and computer vision is the processing by a computer of a digital image to modify the image or to obtain from the image properties of the imaged objects such as object identity, location, size, etc.

A scene contains one or more objects that are of interest and the surroundings which also get imaged along with the objects. These surroundings are called the background. The background is usually further away from the camera than the object(s) of interest.

Segmenting (also called figure/ground separation) is separating a scene image into separate object and background images. Segmenting refers to identifying those image pixels that are contained in the image of the object versus those that belong to the image of the background. The segmented object image is then the collection of pixels that comprises the object in the original image of the complete scene. The area of a segmented object image is the number of pixels in the object image.

Illumination is the light that illuminates the scene and objects in it. Illumination of the whole scene directly determines the illumination of individual objects in the scene and therefore the reflected light of the objects received by imaging apparatus such as video camera.

Ambient illumination is illumination from any light source except the special lights used specifically for imaging an object. For example, ambient illumination is the illumination due to light sources occurring in the environment such as the sun outdoors and room lights indoors.

Glare or specular reflection is the high amount of light reflected off a shiny (specular, exhibiting mirror-like properties—possibly locally) object. The color of the glare is mostly that of the illuminating light (as opposed to the natural color of the object).

A feature of an image is defined as any property of the image which can be computationally extracted. Features typically have numerical values that can lie in a certain range, say, R0–R1. In prior art, histograms are computed over a whole image or windows (sub-images) in an image. A histogram of a feature of an image is a numerical representation of the distribution of feature values over the image or window. A histogram of a feature is developed by dividing the feature range, R0–R1, into M intervals (bins) and computing the feature for each image pixel. Simply counting how many image or window pixels fall in each bin gives the feature histogram.

Image features include, but are not limited to, features that are related to the size of the objects in the image. The simplest features related to size of an object are the object pixels. The boundary pixels, subsets of boundary pixels, and characteristics determined from subsets of boundary pixels are also image features related to object size.

U.S. Pat. No. 4,515,275 to Mills and Richert discloses an apparatus and method for processing fruit and the like, particularly for sorting as a function of variables including color, blemish, size and shape. The fruit is moving on a conveyer belt while being rotated and imaged by a line scanning diode array. The line scanning diode array is sufficiently long such that the scanning line is longer than the fruit item and gives information about the length of the fruit. The number of individual detector signals which reflect presence of the fruit contains information to determine the width of the fruit. These numbers are squared and summed, the result being a representation of fruit volume, a characteristic related to fruit size.

U.S. Pat. No. 5,020,675 to Cowlin et al. discloses an apparatus for sorting conveyed articles. Sorting of food products such as vegetables or fruit, is achieved in accordance with their size, weight and color, or the presence of defects on them. Size is determined by the combination of examining the leading and following trailing edge of a trace and the color count of each article on the conveyer. To this information, weight information from load cells can be added.

The use of a zero order moment of a binary thresholded image of an object is an effective method for identifying the size of an object in an image. Similarly, the use of matched binary filters is effective for verifying the size of a target object in the image. The use of multiple matched binary filters allows for classifying the size of an object. The reason is that under well controlled imaging conditions, good segmentations can be obtained which, in turn, allow for precise measurements with the above methods.

Both for moment and matching techniques to work for object size recognition, very precise segmentations of the object from the background are needed. Furthermore, for matched filtering techniques, the exact orientation of the object in the image has to be known a priori.

STATEMENT OF PROBLEMS WITH THE PRIOR ART

In summary, much of the prior art in the agricultural arena is concerned with classifying/grading produce items. This prior art can only classify/identify objects/products/produce if they pass a scanner one object at a time. It is also required that the range of sizes (from smallest to largest possible object size) of the object/product/produce be known beforehand. These systems will fail if more than one item is scanned at the same time, or to be more precise, if more than one object appears at a scanning position at the same time. That is, the objects have to be singulated before size recognition.

Further, the prior art often requires a carefully engineered and expensive mechanical environment with carefully controlled lighting conditions where the items are transported to predefined spatial locations. This does not allow for the prior art to distinguish between produce sizes in a cost effective fashion. Prior art will fail if there are multiple instances, possibly touching and overlapping, of the object present at the time scanning takes place. Prior art size recognition/grading systems also do not allow for the objects to be packaged in transparent plastic bags. Mechanical means of transporting the objects and algorithms for segmenting object images from background images will fail under these conditions.

Additionally, none of the prior art are trainable systems where, through human or computer invention, new item sizes are learned or old item sizes discarded. That is, the systems can not be taught to recognize object sizes that were not originally programmed in the system or stop recognizing object sizes that were originally programmed in the system.

One area where the prior art has failed to be effective is in produce check out. The current means and methods for checking out produce poses problems. Affixing (PLU—price lookup) labels to fresh produce is disliked by customers and produce retailers/wholesalers. Pre-packaged produce items are disliked, because of increased cost of packaging, disposal (solid waste), and inability to inspect produce quality in pre-packaged form.

The process of produce check-out has not changed much since the first appearance of grocery stores. At the point of sale (POS), the cashier has to recognize the produce item, weight or count the item(s), and determine the price. Currently, in most stores the latter is achieved by manually entering the non-mnemonic PLU code that is associated with the produce. These codes are available at the POS in the form of printed list or in a booklet with pictures.

Problems arise from this process of produce check-out. Certain produce items, e.g., apples and oranges, are graded and priced by variety and size. Size is described in terms of the number of apples contained in a box: 48s are extremely large, with only 48 filing a box, and 216s are the smallest that are commercially packed, with 216 fitting in the same size box. It is difficult for a cashier to visually estimate the size of certain variety of produce since no comparative example is available at the POS.

OBJECTS OF THE INVENTION

An object of this invention is an improved apparatus and method for recognizing the size of objects such as produce.

Another object of this invention is an improved trainable apparatus and method for recognizing the size of objects such as produce.

Another object of this invention is an improved apparatus and method for recognizing and pricing objects such as produce based on size at the point of sale or in the produce department.

SUMMARY OF THE INVENTION

The present invention is a system and apparatus that uses image processing to recognize or measure the size of objects within a scene. The system includes an illumination source for illuminating the scene. By controlling the illumination source, an image processing system can take a first digitized image of the scene with the object illuminated at a higher level and a second digitized image with the object illuminated at a lower level. Using an algorithm, the object(s) image is novelly segmented from a background image of the scene by a comparison of the two digitized images taken. A processed image (that can be used to characterize object size features) of the round object(s) is then compared to stored reference images. The size of the object is recognized when a match occurs.

Processed images of an object(s) of unrecognized size can be labeled with the actual size of the object and stored in memory, based on certain criteria, so that the size of an object will be recognized when it is imaged in the future. In this novel way, the invention is taught to recognize the size of previously unknown objects.

Size recognition is independent of the number of the round objects because a plurality of size measurements is determined from object(s) boundary and the object size is novelly determined from this plurality of size measurements. In this way, the invention is taught to recognize the size of object of previously unknown size.

A user interface and apparatus that determines other features of the object (like color, texture) for identification of the object can be used with the system.

DETAILED DESCRIPTION OF THE INVENTION

Figure 1:
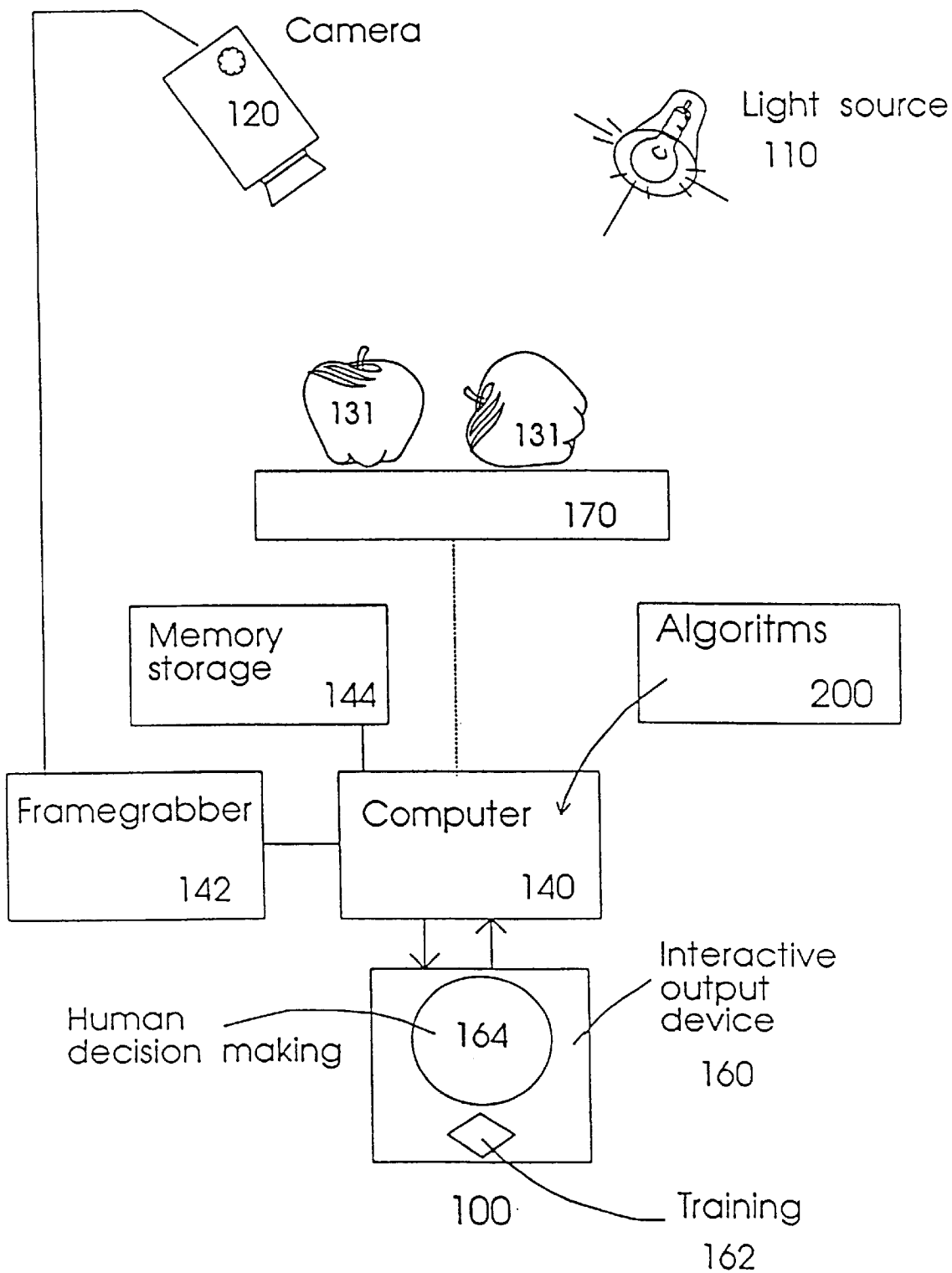
FIG. 1 is a block diagram of the one preferred embodiment of the present system.

The apparatus 100 shown in FIG. 1 is one preferred embodiment of the present invention that uses image processing to automatically recognize the size of one or more objects 131.

A light source 110 illuminates the object 131. The preferred lights are flash tubes Mouser U-4425, or two GE cool-white fluorescent bulbs (22 Watts and 30 Watts), GE FC8T9-CW and GE FC12T9-CW, respectively. Such light sources are well known.

A video input device 120 is used to convert the reflected light rays into an image. Typically this image is two dimensional. A preferred video input device is a gray-scale or color camera but any device that converts light rays into an image can be used. These cameras would include CCD camera and CID cameras. If a color camera is used, the output can be RGB, HSI, YC, or any other representation of color. One preferred camera is a Sony card-camera CCB-C35YC or Sony XC-999. Video input devices like this 120 are well known.

Gray-scale or color images are the preferred sensory modality in this invention. However, other sensor modalities are possible, e.g., infra-red and ultra-violet images. These modalities can be enabled with known methods of illuminating and measuring the object 131 and with a compatible imaging device 120 for creating the image.

The object 131 is the object being imaged and its size recognized by the system 100. The object 131 can comprise one or more items. It is preferred that objects 131 be of one type (variety) and size, e.g., one or more apples of a same variety and size. The objects can be virtually anything that can be imaged by the system 100, however preferred objects 131 are bulk items that are roughly spherical in shape including produce (fruits and vegetables), hardware etc.

A calculating device 140, typically a computer 140, is used to process the image generated by the video input device 120 and digitized (to be compatible with the computer 140) by a frame grabber 142.

The processing is performed by an algorithm 200. Other calculating devices 140 include personal computers and workstations. The calculating device 140 can also be one or more digital signal processors, either stand-alone or installed in a computer. It can also be any special hardware capable of implementing the algorithm 200. A preferred embodiment is a Datatranslation DSP board DT 2878 coupled to a Datatranslation DT 2871 frame grabber board residing in an IBM ValuePoint computer, or in the IBM 4690 series of POS Cash Registers. The frame grabber 142 is a device that digitizes the image signal from the camera 120. If the camera 120 is a digital camera then a separate frame grabber 142 may not be required. The digitizer may be separate from the computer 140 or an integrated part of it. The image may be stored in a standard memory device 144. Given this disclosure, one skilled in the art could develop other equivalent calculating devices 140 and frame grabbers 142.

Figure 15:
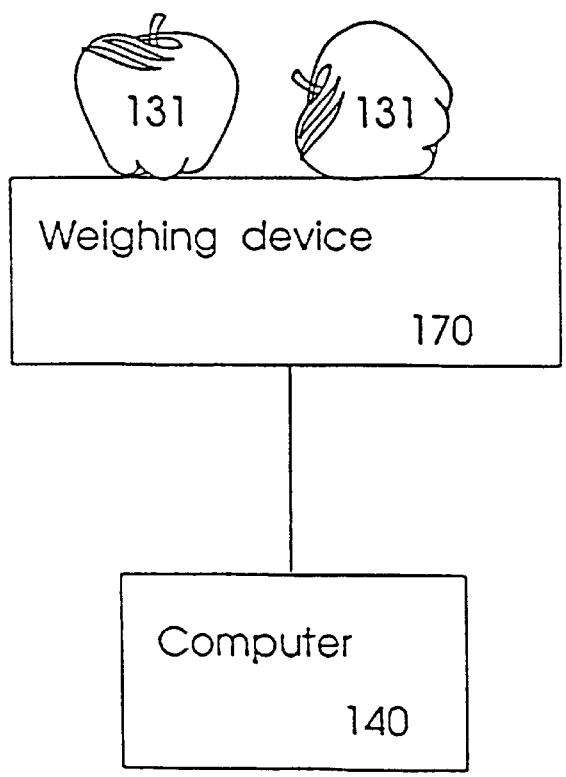
FIG. 15 is a block diagram showing a weighing device.

An optional interactive output device 160 can be connected to the calculating device 140 for interfacing with a user, like a cashier. The output device 160 can include screens that assist the user in decision making 164 and can also provide mechanisms 100 to train 162 system to recognize new object sizes (see FIG. 16). An optional weighing device 170 can also provide an input to the calculating device 140 about the weight of the object(s) 131; see description below (FIGS. 15 and 17).

Figure 2:
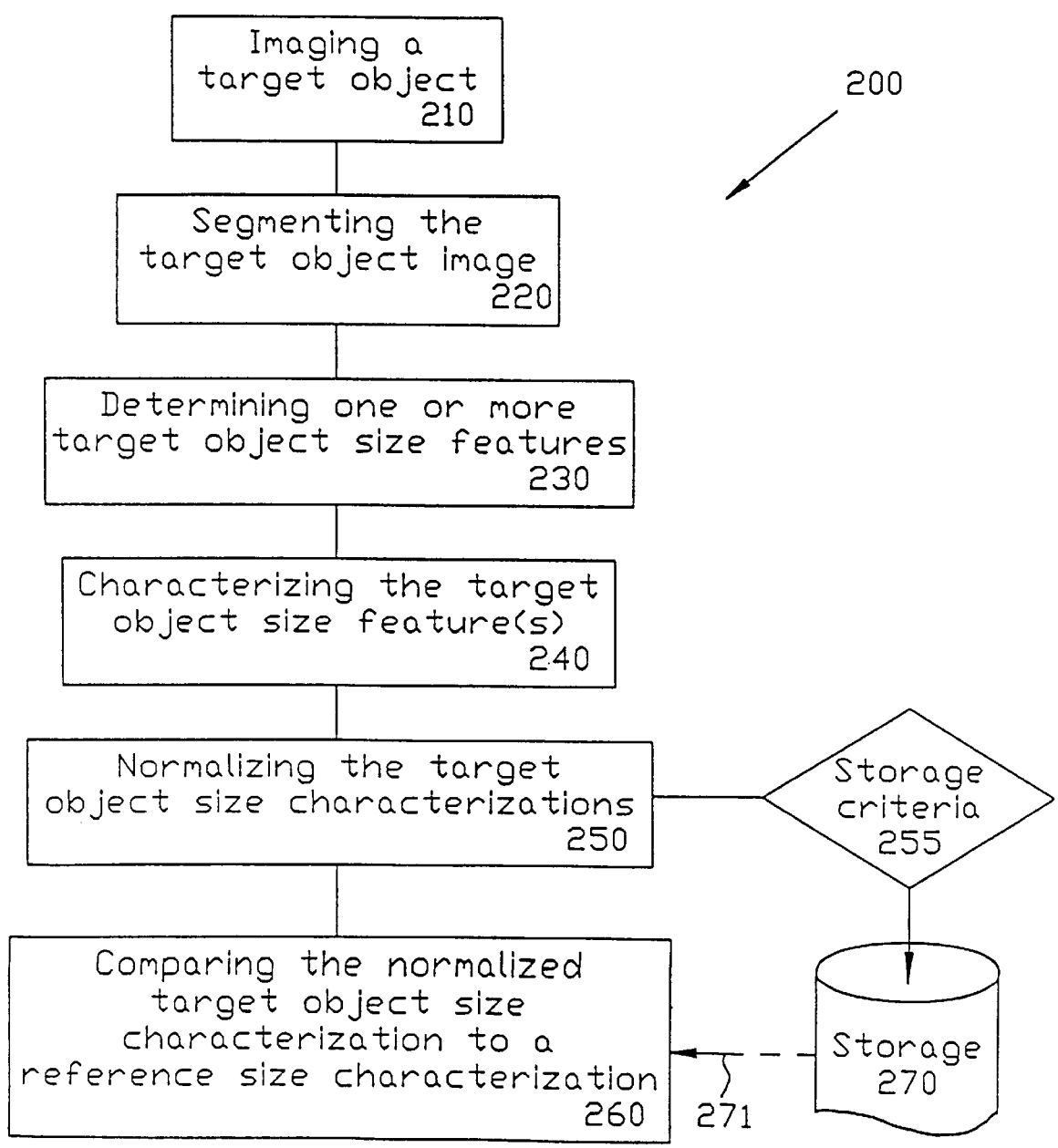
FIG. 2 is a flow chart showing one preferred embodiment of the present method for recognizing object size.

FIG. 2 is a flow chart of the algorithm 200 run by the calculating device, or computer 140. In step 210, a target object whose size is to be recognized is imaged by camera 120. Imaging like this is well known. The image of the target object 131 is then novelly segmented 220 from its background. The purpose of step 220 is to separate the target object 131 from the background so that the system 100 can compute size characteristics of separated object 131 image boundary pixels independently of the background of the scene. In step 230 one or more size features of the object 131 are determined, preferably from three or more boundary points. In step 240, a characterization of these determined size feature sets are developed. Normalizing, in step 250, ensures that these characterizations only depend on the actual size of individual object(s) 130 and do not depend on the actual area, length, or characteristics related to area/length that the object(s) 131 occupy in the image. This allows one or multiple instances of object size 131 to be recognized as the same object size. Preferred means of normalizing the size characterization by the segments occupied by objects 131 in the image is achieved by counting the number of times size characteristic(s) are computed; if the quality of size measurement are weighted in the size characteristics, this is accounted for in the normalization. (This is described further in FIG. 12.) In step 260 the count-normalized characterization of the target object size is compared with the count-normalized characterizations of reference object sizes, which are stored in memory storage 270. The storage 270 may be located in the storage device 144 or computer 140. (See the description of training in FIG. 13.)

In step 255 count-normalized size characterizations are stored, depending on certain criteria 255 in computer memory 270. This step enables the system 100 to be novelly trained, since the storage criteria 255 might permit storage 270 of new reference images which can later 271 be compared to target 131 images. (See the description of FIG. 16.)

Figure 3A:
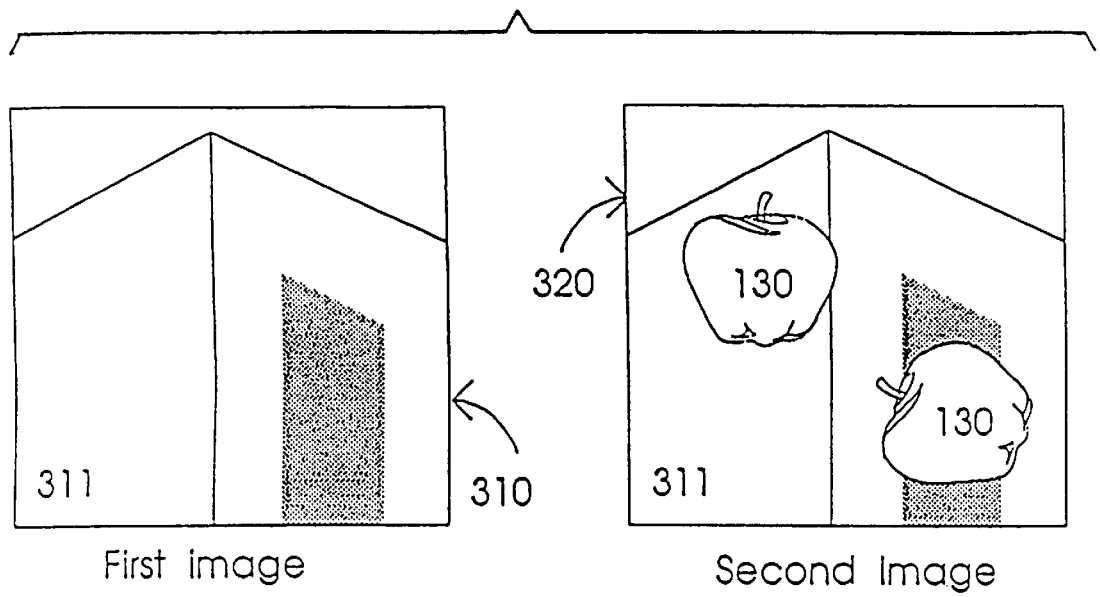
FIGS. 3A–3B illustrates segmenting a scene into an object image and a background image.
Figure 3B:
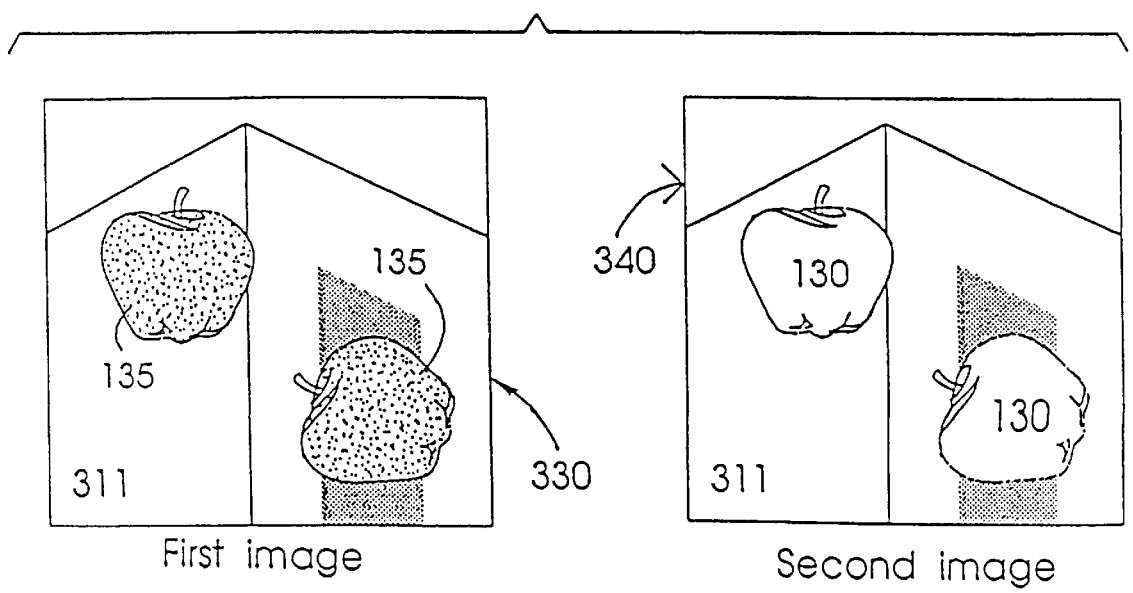

Step 220 is the segmenting or separating of the object image from the background image. This step is performed so that the size features of the target object can be determined independently of the effects and disturbances of the background of the scene. FIG. 3 illustrates two preferred methods (FIG. 3a and FIG. 3b, respectively) that segment the object image from the background image.

FIG. 3a shows two scenes. The first imaged scene 310 shows an image of a background 311 without any other objects present in the field of view of camera 120. The second image scene 320 includes both an image of the scene background 311 and an image 130 of one or more objects 131. Here the pixels of the imaged object 130 replace pixels in the background image 311 in those areas of the scene image 320 where object 131 is present. Hence, it is an image of background 311 with instances of objects 131 present in the scene.

A comparison of the scenes 310 and 320, preferably on a pixel basis, allows the object image 130 to be segmented (separated out) from the background image 311 of the scene. If for a given pixel in the 320 image, the brightness is different from (e.g., more than) the image brightness of same pixel in 310, this pixel belongs to object image 130. If for a given pixel in the image 320, the brightness is equal to the brightness of the same pixel in 310, this pixel belongs to background image 311. (See the description of FIG. 5).

FIG. 3b shows two images of a scene with a background and one or more objects produced by a preferred embodiment of this invention that enables, segmentation of the object image. Image 330 in FIG. 3b is an image of a scene (including objects 131 and a background 311) with light source 110 off. That is, the scene image 330 consist of an image of background 311 illuminated by ambient light. Also in the scene image 330 are the object images 135 obscuring the background. Because the light source 110 is off, object images 135 appear dark in scene image 330 because they are not illuminated by the light source 110.

Image 340 in FIG. 3b is an image of the scene with light source 110 on. In this case, the light source 110 illuminates objects 131 in the field of view of camera with an amount of light greater than ambient light. This results in the object images 130 being brighter (than in scene image 330) in scene image 340.

Figure 4:
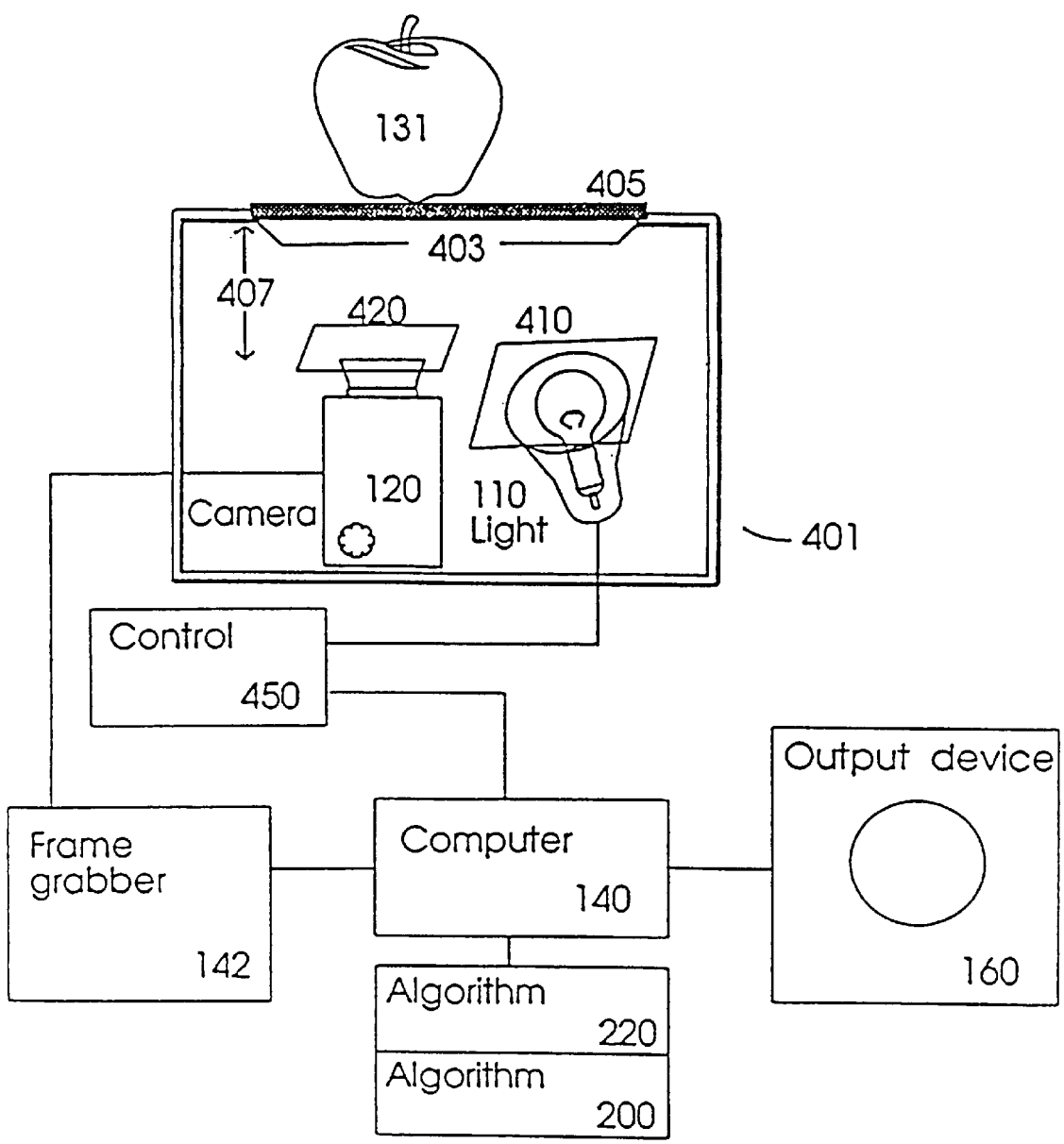
FIG. 4 is a block diagram of a preferred embodiment of apparatus for segmenting images and recognizing object size in images.

FIG. 4 is a block diagram showing a preferred system 400 for imaging scenes (such as those described in FIG. 3), segmenting object images 130 from their background image 311 of the physical background 312, and recognizing the size of object(s) 131. A general description of component 401 of this system 400 can be found in U.S. Pat. No. 5,631,976 Ser. No. 08/235,064, entitled "Object Imaging System" to Bolle et al. filed on Apr. 29, 1994, and issued on May 20, 1997 which is herein incorporated by reference in its entirety. U.S. Pat. No. 5,546,475 entitled "Produce Recognition System" to Bolle et al. filed on Apr. 29, 1994 and issued on Aug. 13, 1996 describes related embodiments of system 400 and is also incorporated by reference in its entirety.

The preferred system 400 places the object 131 above light 110 and camera 120, thus providing images of object 131 looking up from below. The system 400 provides a support 405 for the object 131 and also ensures that the object is at a fixed and repeatable distance 407 from camera 120. In addition, the system 400 allows imaging of a shiny object (like a plastic bag) with reduced glare (specular reflections) in the image by providing a filtering system comprised of 410 and 420.

The system 400 comprises an opaque enclosure 401 for the light 110 and camera 120. The enclosure has a single opening 403 facing the object 131. The opening 403 is of a sufficient size to allow the object 131 to be imaged by the camera 120 and illuminated by the light 110. The opening can be square, round or any other shape. A transparent surface 405 covers the opening 403 in the enclosure 401. This surface 405 could be a sheet of glass. The transparent surface 405 provides a support on which the imaged object 131 can be placed. By placing the object 131 on the surface 405, the distance 407 between camera 120 and object 131 remains fixed thus providing the means for repeatable imaging.

To remove glare from the image of object 131 (from object 131 itself, possibly a surrounding plastic bag, and the surface 405) a polarizing filter 420 is incorporated with the lens of camera 120 or placed just above the lens of the camera 120. A second polarizing filter 410 is placed between the light 110 and the opening 403. This insures that the light reaching the object 131 is polarized. Alternatively, the light may be completely enclosed by the polarizer. If the light is partly enclosed in a box (such as a camera flash) or by a reflector (such as a photographic spot-light) the polarizer needs to be placed only on the opening in the light assembly which allows the light through. The direction of the polarization in first filter 410 is orthogonal to the direction of polarization in second filter 420. It is well-known from prior art that specular reflection reflected off an object (such as object 131) is polarized as opposed to the diffuse (matte) reflection reflected off the object. Imaging object 131 with a polarizing filter 420 thus reduces glare in image. Further, illuminating 131 with light 110 polarized by 410 reduces the amount of glare on object 131. Polarizer 410 also ensures that the polarization angle of the reflected specular light, off object 131 is orthogonal to polarizer 420. Hence, imaging object 131 through polarizer 420 which is orthogonal to polarizer 410 further reduces the amount of glare in object image 130.

A light control 450 switches the light 110 on and off, or switches light 110 between different intensity levels. The control 450 may be implemented on the computer 140 or be connected directly to the light 110 or may be a separate device. The control may be a part of the light 110 as a timing device such as in a strobe. The control may be synchronized with the camera or the computer or both. Light switching controls 450 are well known.

Figure 5:
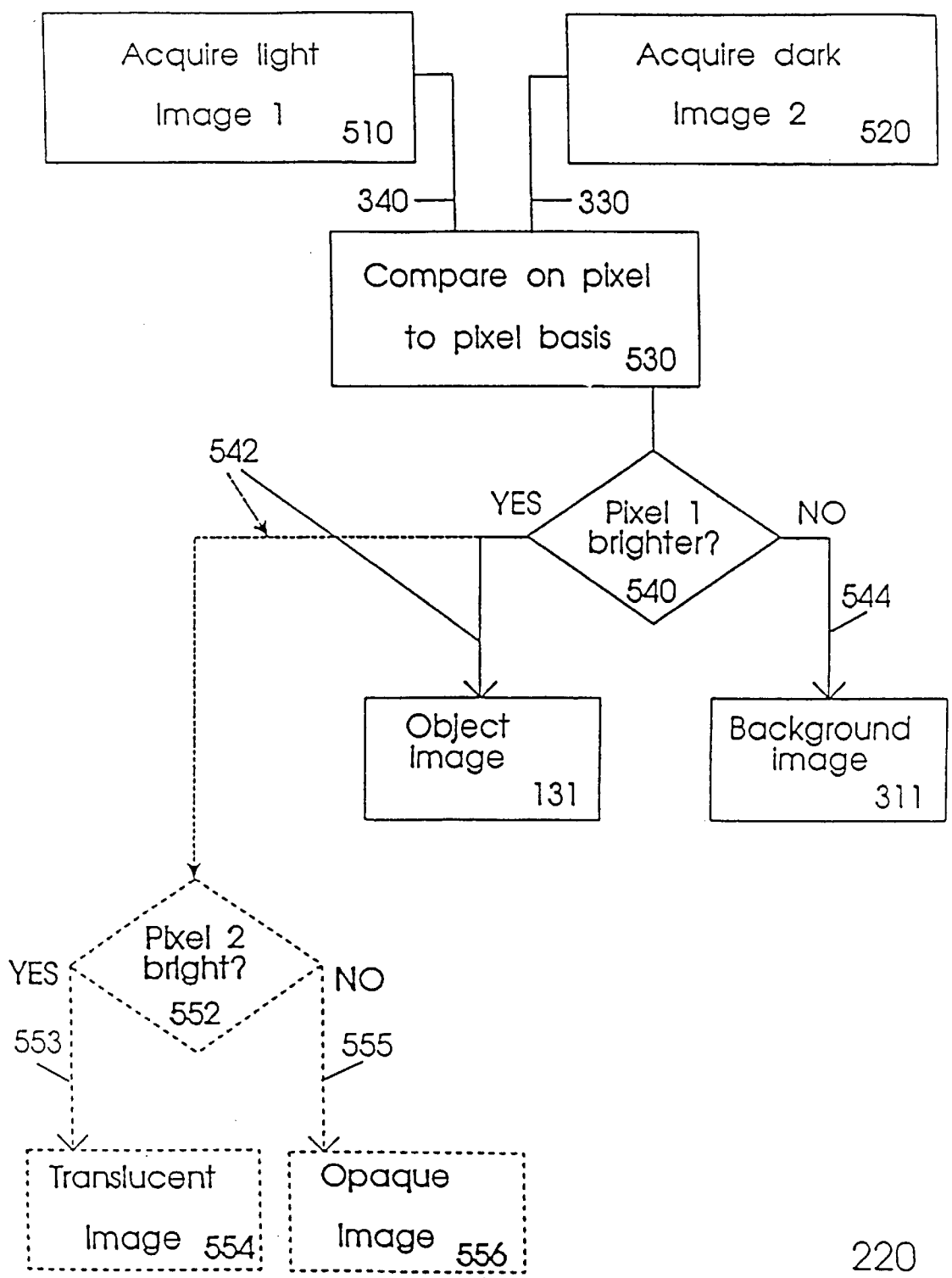
FIG. 5 is a flow chart of a preferred method for segmenting target object images.

FIG. 5 further describes the segmenting step 220 of FIG. 2. Shown in this figure is a preferred method for segmenting the object image from the scene.

In step 510, an image (a first image) of the scene is produced with the light 110 switched on, or at a higher intensity, so as to illuminate object 131 properly. Control 450 controls the light 110 switching.

In step 520, a second image of the scene is produced with the light 110 switched off or set to a level below the level in step 510. The setting of the light 110 should be such that the object 131 appears darker in the second image than in the first image. By performing these novel steps, the object image 130 can be separated or segmented from the background image 311 in the steps below.

Further, the object 131, the background 312, and the image input device 120 should be at the same position in both step 510 and 520 to assure that the first and second images are in spatial registration. Suppose each pixel is numbered starting in the upper left corner of the image then proceeding across the first line then down to the second line in the manner of reading a book. Registration means that each numbered pixel in the first image corresponds to the same area of the scene (object(s) 131 and background 312) as the identically numbered pixel in the second image. Proper registration can be ensured by either acquiring the first and second image in quick succession, or by imaging a stationary object 131 against a stationary background 312.

The order of acquiring the first and second image may be reversed; that is, step 520 can be performed before step 510.

In step 530 of the algorithm 220, the first and second images are digitized in the frame grabber 142. In the computer 140, each and every pixel in the first digitized image is compared to the respective pixel at the same location in the second digitized image. Pixel by pixel comparisons such as this are known in the image processing art. For example, although the pixels in each pair being compared must correspond to one another (i.e., be in the same respective location in each image), the corresponding pixel pairs in the images can be compared in any order. Further, alternative comparisons can be made, e.g., comparing every second or third pixel.

In step 540, a check is performed on a pixel-by-pixel basis to determine if a pixel in the first image is brighter than the corresponding pixel in the second image by more than a value T. In any pixel comparison, if the pixel in the first image pixel is brighter than its corresponding pixel in the second image by more than T, the algorithm 220 takes the branch 542 and designates this pixel as corresponding to the object 131. Likewise, if the pixel comparison shows that the pixel in the first image is not brighter than its corresponding pixel in the second image by more than the value T, the algorithm 220 takes the branch 544 and designates this pixel as corresponding to the image 311 of physical background 312.

The value of tolerance T may be constant. A preferred tolerance T is 5% of the largest image intensity. Alternatively, the value of T may vary depending on the positions of pixels in the image or depending on the intensity of the pixel in the dark image. The positional variation of T allows the system to compensate for uneven illumination from source 110. The dark intensity variation of T allows the system to correctly identify foreground objects with low reflectivities (such as black objects). The value T may be fixed or may be recomputed from time to time by the system. It might, for instance, be necessary to change the value of T as light source 110 ages or changes in intensity for some other reason (such as a variation in the AC line voltage supplied to the bulb). This recomputation could be performed on a pair of images of the background with no object (one image of the background 312 highly illuminated and one less so). Since no object is present, both background images should appear to be illuminated the same amount (with ambient light). However, in practice, the light 110 might illuminate the background 312 slightly when the light is switched to a higher intensity. Therefore a tolerance T is chosen for the comparison of the corresponding pixel pairs. The tolerance T could then be set so that only a very small number of pixels in this pair of background images actually passes the test. For example, in a preferred embodiment, T would be set so that fewer than 10% of the pixel pairs differ in illumination more than the tolerance T.

In a preferred embodiment, the steps 530 and 540 are performed on a pixel by pixel basis for each pixel location in the scene image. The result is that the pixels corresponding to the object 131 are collected in a segmented object image 130. Specifically, in the segmented object image, all pixels from the first image that are substantially brighter than their corresponding pixel in the second image are collected in segmented object image at the position they were in the first image. Therefore, the segmented object image corresponds to the desired image of the object 131 removed from the background 312. If needed, the remaining pixels in the image (e.g., the pixels not corresponding to the object image 130) can be assigned any desired value and/or can be further processed using known image processing techniques.

In like manner, the pixels corresponding to the background 312 are collected in a segmented background image 311. Specifically, all pixels from the first image that are not substantially brighter than the corresponding pixel in the second image are collected in the segmented background image at the position they were in the first image. (In a preferred embodiment, "substantially brighter" means that the difference in illumination between the pixels in the corresponding pixel pair is greater than the tolerance, T.) The segmented background image corresponds to the image of the background 311 with the object 130 removed. If needed, the remaining pixels in the segmented background image (i.e., those corresponding to the removed object pixel locations) can be assigned any desired value and/or further processed using known image processing techniques.

If only the image of the object 130 is desired, steps 544 to obtain 311 need not be performed. Similarly, if only the image of the background 312 is desired, step 542 to obtain 130 need not be performed.

In an alternative preferred embodiment, a translucent part of the object 131 (for example, a plastic cover) may be separated from an opaque part of the object 131, by adding steps 552, 554, and 556.

In this embodiment, branch 542 goes to step 552 instead of step 130. Before step 552, it has been determined already that the pixel in the first image is brighter than its corresponding pixel in the second image. Step 552 determines if the object 130 pixels of the second image (the object 131 under low illumination) are brighter than a value V, a second tolerance value. If so, branch 553 is taken and the object pixel belongs to the translucent part 554 of object image 130. (The object is translucent at this pixel location since some ambient light passed through the object 130 and was imaged at this location when the light 110 was switched to low illumination.) If not, then branch 555 is taken and the pixel belongs to opaque part 556 of object image 130. (No ambient light, or an amount below the tolerance, V, is measured through the opaque part of the object 130.) The value V may be constant for each pixel in the second image or may be variable, depending, for example, on the position of the pixel in the second image. Note that the value, V, may further be computed as describe above, from an image of the background 135 alone, by choosing a V such that 95% to 85% of the background image is brighter than V. A preferred value for V is 20% of the brightest image intensity.

In step 554, a translucent object image is created. In this step, each pixel in the first image (which belongs to the object) which corresponds to a pixel in the second image that is brighter than the value V, corresponds a translucent part of object 130 and is stored in a translucent object image. After all pixels of the first and second images are so processed, the translucent object image will contain only the image of the translucent parts of object image 130. If needed, the remaining pixels of the translucent object image may be assigned any desired value and/or processed further.

In step 556, an opaque object image is created. In this step, each pixel in the first image (which belongs to the object) which corresponds to a pixel in the second image equal to or darker than the value V, corresponds to an opaque part of object image 130 and is stored in the opaque object image 556. After all pixels of the first and second images are so processed, the opaque object image will contain only the image of the opaque parts of object image 130. If needed, the remaining pixels of the opaque object image may be assigned any desired value and/or be further processed.

If only an image of the opaque parts of the object 130 is desired, step 554 need not be performed. Similarly, if only an image of the translucent parts of the object 130 is desired, step 556 need not be performed.

In another preferred embodiment, step 552 is combined with step 540 and steps 542 and 130 are removed. This results in the translucent object image or the opaque object image (or both) but not the complete segmented object image 130.

Other combinations of steps 552, 554 and 556 with the previous steps are within the contemplation of this invention.

Figure 6:
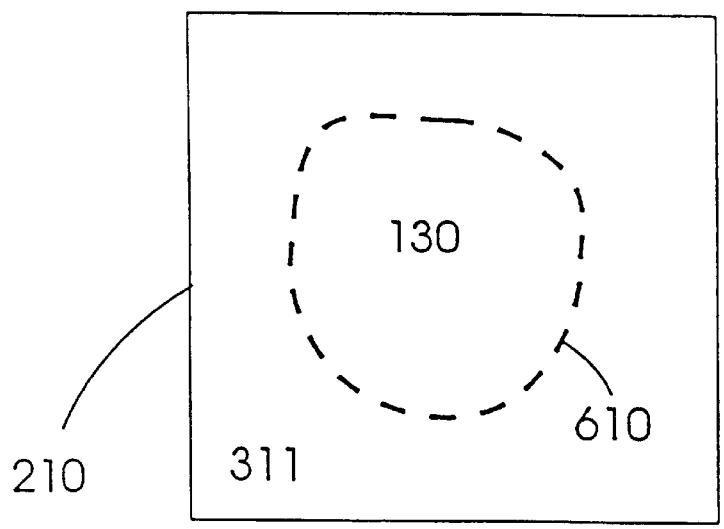
FIG. 6 shows the boundary points of a segmented object image.

FIG. 6 is a schematic indication of the boundary points 610 of a segmented object image 130. Boundary points of object image 130 are defined to be those points of the object image that have points in the background image 311 as neighbors. A neighboring point of pixel A can be defined in multiple ways (prior art). A first way is 4-connectivity, where a pixel B is said to neighbor pixel A if it has any of the locations of X in

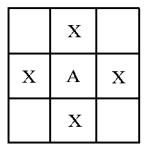

Alternatively, a second method to define neighbors of pixel A is through 8-connectivity. Here a pixel B is said to neighbor A if it is in any of the locations X of

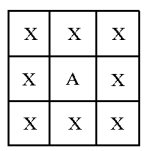

Figure 7:
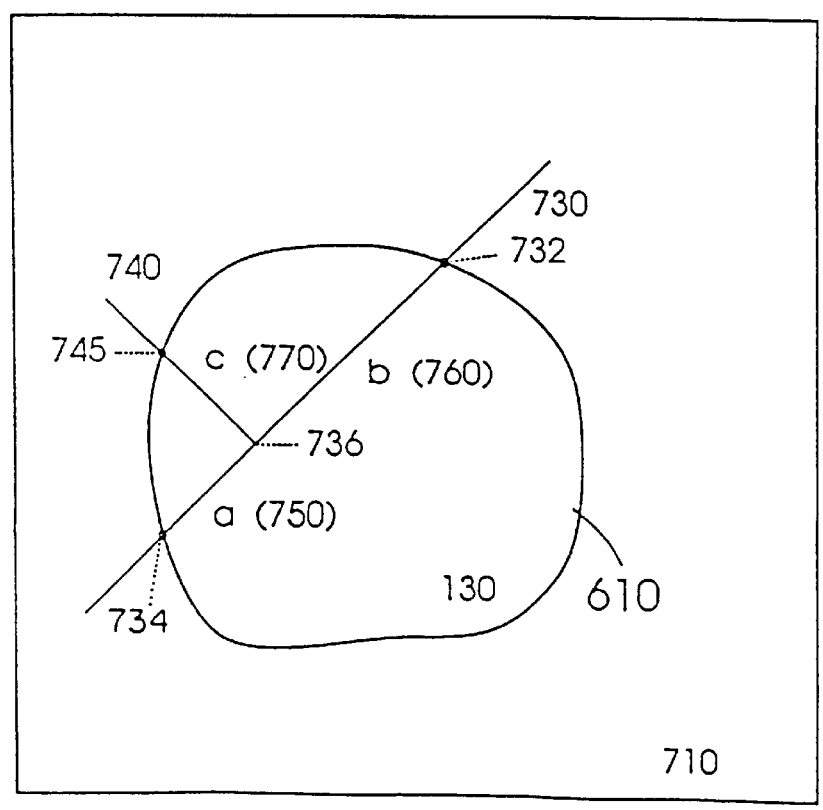
FIG. 7 shows the preferred method of determining an object size characteristic from three or more boundary points.

FIG. 7 indicates a method for selecting three points on the object boundary 610 of segmented image(s) 130 of the object in image 710 and a preferred method for determining a size characteristic of the segmented object image. To obtain an object boundary, the scene is first imaged (step 210 of FIG. 2) and the object image 130 is segmented 220.

A line 730 is drawn in image 710 (see FIGS. 9 and 10a, 10b, and 10c for a description of how this line is selected). Line 730 can intersect object image in a number of its boundary points. If the number of intersection points is greater or equal to two, sets of two intersection points (points 732 and 734) are selected such that the points on the line between each two intersection points belong to the segmented object image. (If there is only one intersection point, the determination of a size characteristic stops for this line.) The line gives a chord in the object image between points 732 and 734. A third point 736 on this chord is selected (the method for selecting this point is described in FIGS. 9 and 10a, 10b, and 10c). At point 736 a line 740 perpendicular to original line 730 is erected. The erected line must intersect the object image boundary at a number of points which has to be greater or equal to 1 to continue, or else the determination of a size characteristic stops for this line. Of these points intersected by the erected line, the point 745 closest to line 730 is selected. Now there are three boundary points, 732, 734 and 745 and the point 736, being the intersection point of lines 730 and 740.

Given these four points, three distances a (750), b (760), and c (770) are defined as a=dist(point 734 to point 736)

b=dist(point 732 to point 736)

c=dist(point 740 to point 736)

If a+b≦2c the diameter D, given by, $$D=\sqrt{a^2+b^2+c^2+(ab/c)^2}$$

is determined, or else the determination of the size characteristic stops.

The number D is the diameter of the circle that goes through the points 732, 745, and 734 on the object image boundary. The size measures S=$\pi D^2$/4 (area) or S=$\pi D^3$/6 (volume) are an indication of the size of object image segment 130. The advantage of area-based size measurements are twofold. First, the boundary points can be very poor and the method still works; second, the method prescribes selection of points (FIGS. 9 and 10) in a principled manner.

Other methods for determining a size characteristic from three (or more) boundary points are in the contemplation of this invention. Examples are the least-squares fitting circle to four or more boundary points, second-order moments of three or more points, etc.

A plurality of size measures D is determined from object boundary 610 as described in FIGS. 8, 9, and 10a, 10b, and 10c. These size measures are characterized by a size characteristic of the segmented object image in the preferred form of diameter or size histogram as described in FIG. 11.

Figure 8A:
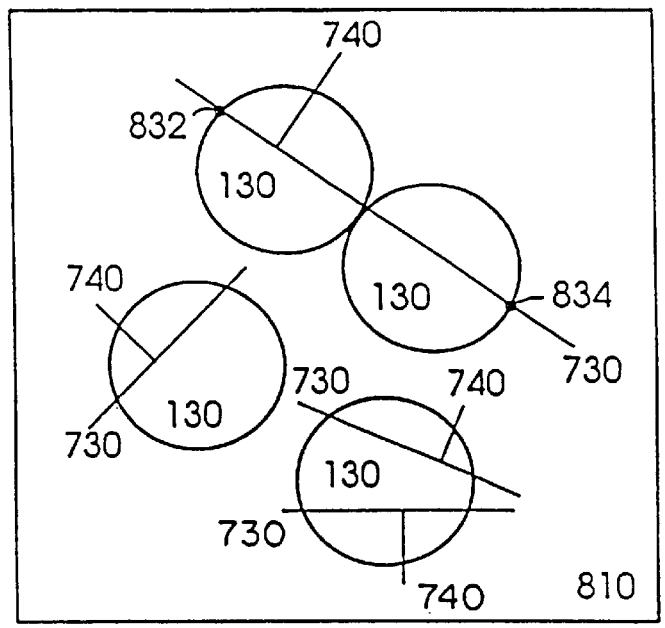
FIGS. 8A–8B shows segmented object images and a subset of the sets of three points used to determine intermediate size characteristics.
Figure 8B:
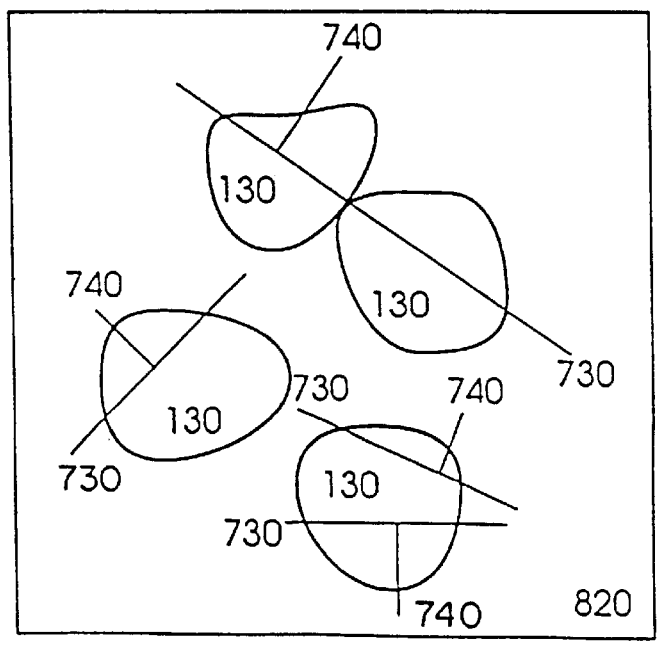

FIG. 8 shows the method for determining size characteristics from an object image boundary when multiple object images 130 are present in the image. FIG. 8a shows image 810 with multiple instances of a round object image 130 present; FIG. 8b shows image 820 with multiple instances of object image 130 present where object images are of similar size.

As described in FIGS. 9 and 10a, 10b, and 10c, multiple intersection lines 730 are projected onto the segmented object images. When a line intersects the object image boundary, in two or more points, a chord on the line that contains image object points can be determined, and a third object boundary point on a perpendicular line exists, and an intermediate size measurement, for example Diameter D, is determined. In such a fashion, a plurality of intermediate size descriptors is obtained from which a size characteristics is developed, as for example a size histogram as shown in FIG. 11. FIG. 8a shows an example of the preferred objects of this invention, circular or round objects 131 that result in round object image segments 130. In this image 810 the objects are touching one another which may result on that some intersection lines 730 have boundary intersection points that belong to different object images 131 (e.g., points 832 and 834). However, a majority of the sets of three boundary points are contained on the boundary of only one object segment and result in a correct intermediate diameter (and correct intermediate size feature). FIG. 8b shows a more realistic example image 820 where the target objects are similar and round only in a first approximation. Again, intersection lines can have boundary intersection points (832, 834) that lie on different object images 130 causing erroneous size measurements. The majority of boundary intersection points give intermediate size measurements that are closely related to the actual size of the object image segments. A size characteristic developed from the intermediate size measurements contains information about the size of object images 130 and the physical objects 131.

Figure 9:
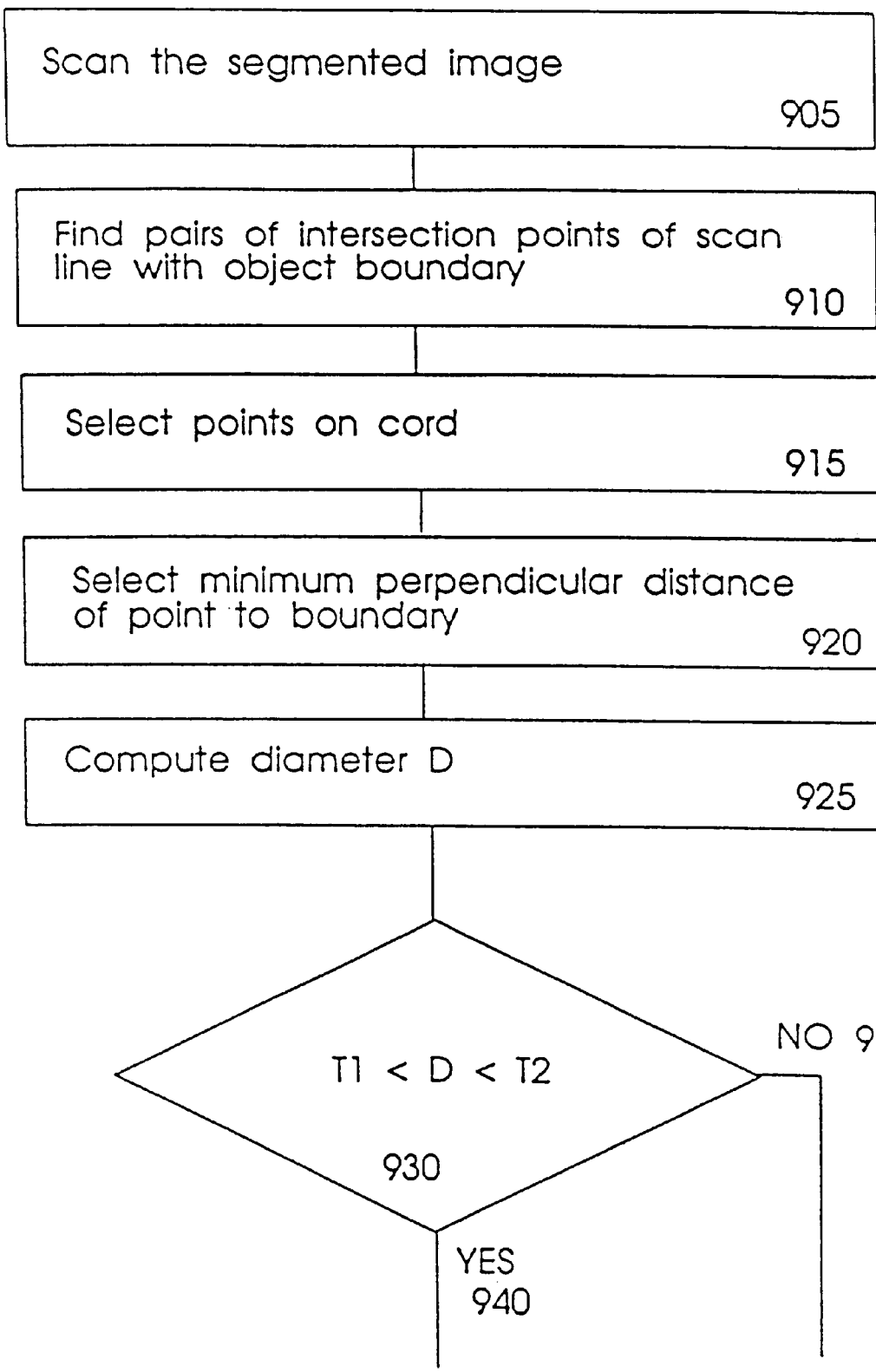
FIG. 9 is a flow chart showing a preferred method of selecting sets of three or more boundary points for size characteristics determination.

FIG. 9 is a flow diagram of one preferred method for selecting a plurality of sets of three points for developing size characteristics of an image of multiple instance of object image 130. Depending on the make and orientation of camera 120, the image may have to be stretched in either the horizontal or vertical direction to be corrected for aspect ratio (that is, if the pixels are not square). For the preferred camera 120, images have to be stretched 125% horizontally.

In step 905, the segmented object image is scanned along lines 730. As a non-limiting example, the image is scanned four times, namely (see FIG. 10a):

(1) horizontal from top to bottom, 952;
(2) in an angle of 45 degrees with the horizontal from bottom left to top right, 954;
(3) vertical from left to right, 956;
(4) in an angle of 135 degrees with the horizontal from top to bottom right, 958.

Figure 10A:
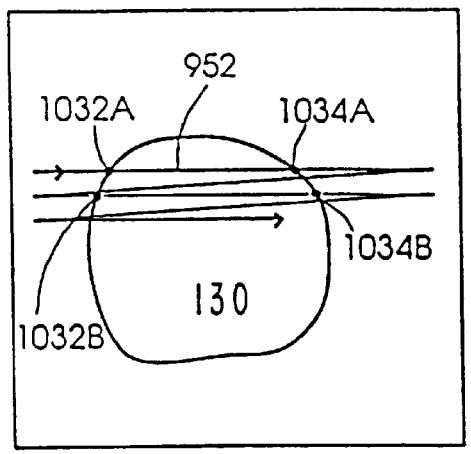
FIGS. 10a, 10b, and 10c show the effects of the boundary point selection algorithm in an image.
Figure 10A:
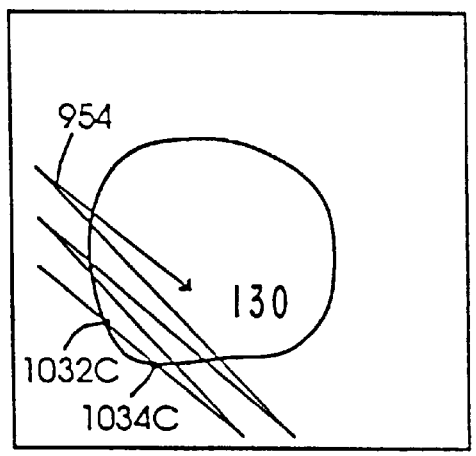
Figure 10A:
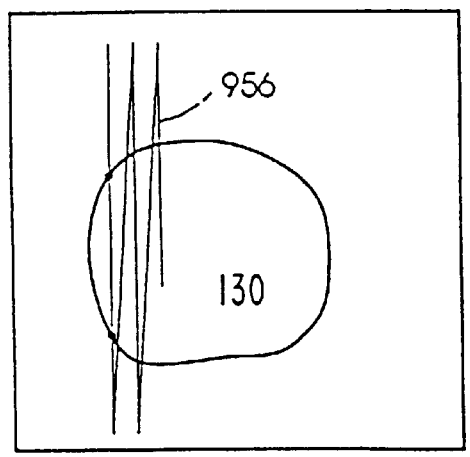
Figure 10A:
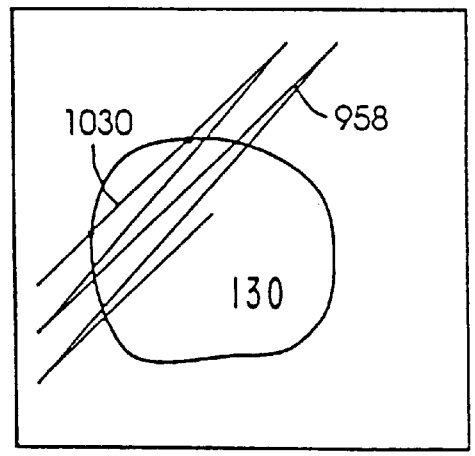
Figure 10B:
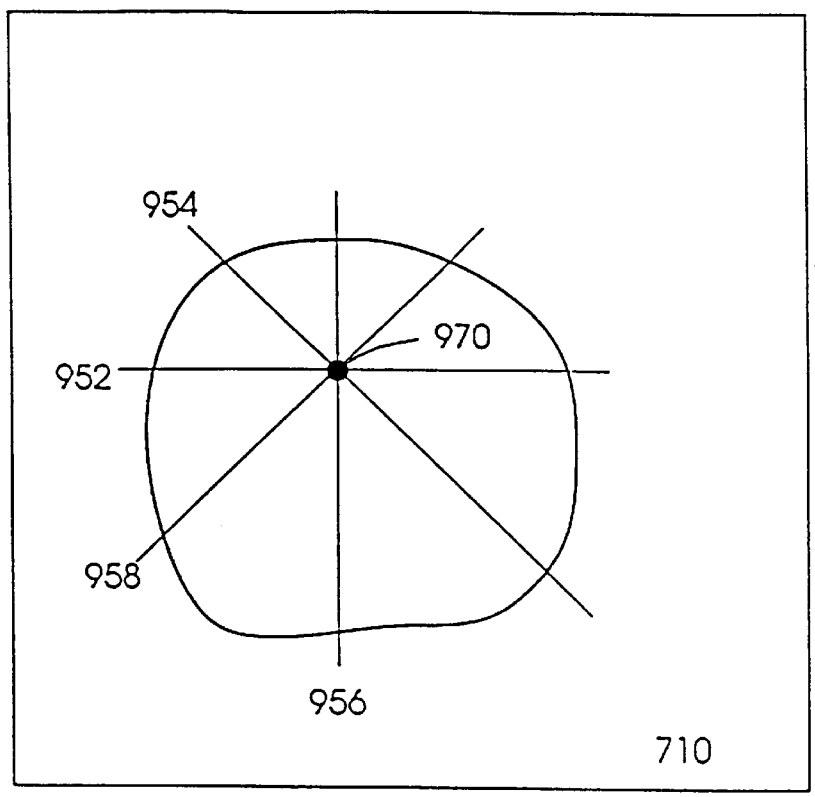
Figure 11:
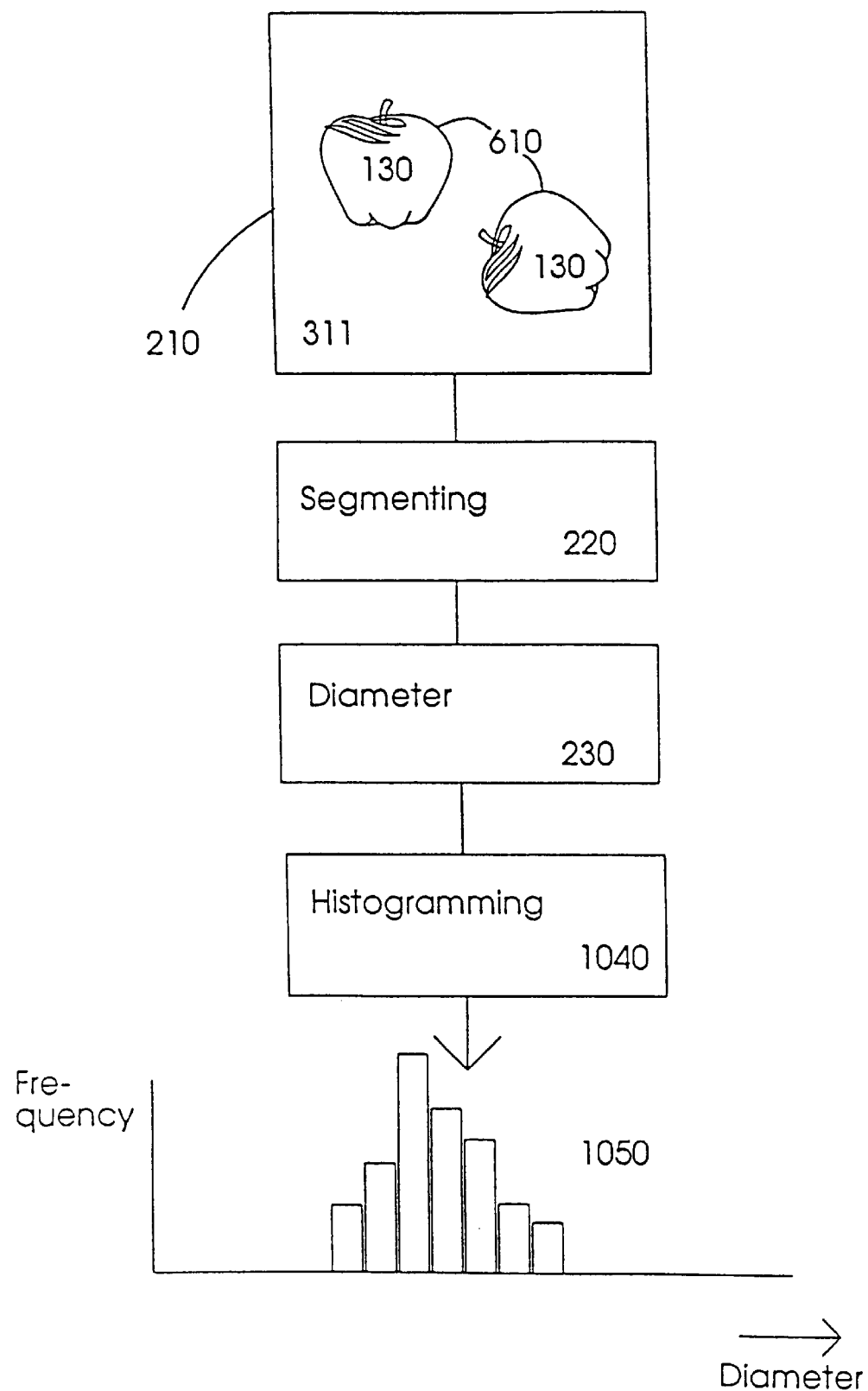
FIG. 11 is a flow chart showing a preferred method of characterizing reference and target object size features.

As shown in one preferred embodiment shown in FIG. 10b, each pixel X (970) in the segmented object image is visited four times, once by each of the four scans above.

Step 910 of FIG. 9 determines the object boundary points that lie on the intersection line. For each scan line in each direction 952, 954, 956, 958 the start object boundary point (typically 1032A, 1032B, and 1032C) and the end object boundary point (1034A, 1034B, and 1034C) is established. Note that each scan line, e.g. 952, 954, 956, and 958, can produce one or more pairs of start object boundary points and end object boundary points. This is determined by the number of times the scan line (952, 954, 956, and 958) crosses the object boundary points. (Pairs of start and end object boundary point may or may not be created on the "fly back" passes of the scan lines.) One or more chords (typically 1030) is defined between each of the pairs of start and end object boundary points (typically 1032A and 1034A; 1032B and 1034B; and 1032C and 1034C).

In step 915, one or more points on each of the defined chords are selected. This can be done by choosing every pixel 1081–1085 that lies in the segmented object image 130 and on the chord 130. See FIG. 10c.

Figure 10C:
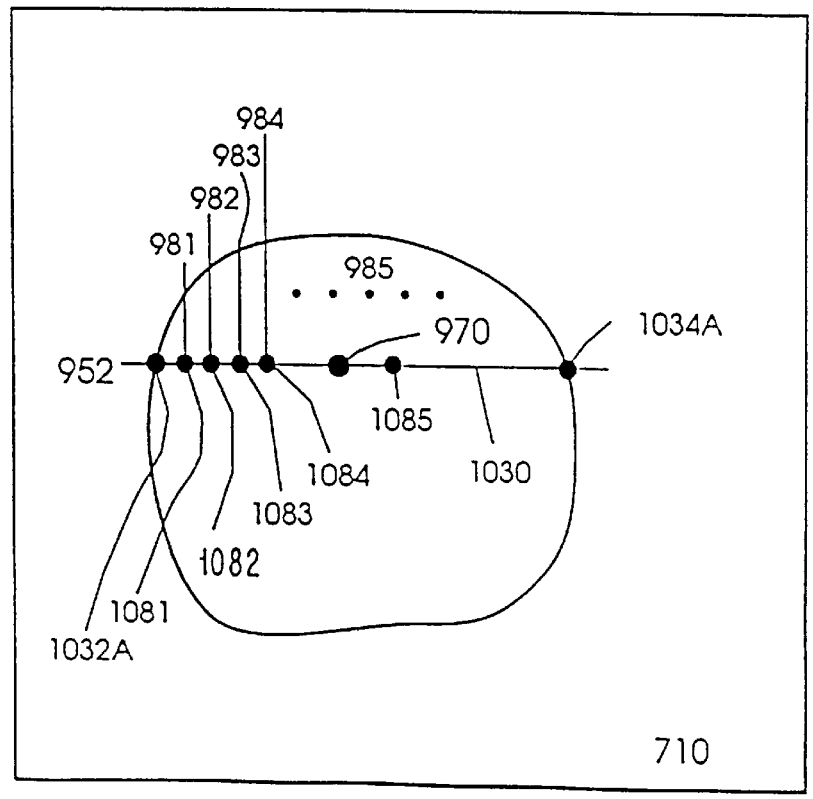

In step 920, for the selected object image points (typically 1081–1085 in FIG. 10c) along the chord 1030 line between begin and end object boundary point, perpendicular lines are erected as displayed by the lines 981, 982, 983, 984 and so on 985 in FIG. 10c. Each scan line 952 and each of the respective erected perpendicular lines 981, 982, 983, 984 give the three points (734, 732, and 745) on the object shown in FIG. 7. The result is that a plurality of sets of three object boundary points are selected.

Step 925 is the determination based on three object boundary points 733, 734, and 740 of a size characteristic. A size characteristic is developed for one or more of the set of three object boundary points (typically 732, 734, and 745) in the plurality of sets of three object boundary points. The more size characteristics that are computed the better it is and the number of size characteristics that are computed depends on the area of object image 130.

A preferred size characteristic is the Diameter D which is computed as described in FIG. 7. Other size characteristics are contemplated. The associated size S is given by $\pi D^2/4$ (area) or $\pi D^3/6$ (volume).

Step 930 is an optional test on the computer diameter. If T1<D<T2, the Diameter D is considered a valid one 940, if this is not the case 935, the Diameter is not accounted for in the development of the histogram. This check is used if it is known that the objects 131 are round and prior knowledge on the size range of 131 is available. The thresholds T1 and T2 are then the lower and upper bounds of the diameter range. Other validity checks can be used.

As shown in FIG. 10b, associated with every pixel 970 there are four diameter (size) estimates D1, D2, D3, D4 in this example embodiment. This is because every pixel 970 in the object image is visited exactly four times, once by each scanning process of FIG. 10a.

FIG. 11 is a flow chart showing one preferred method of developing a characteristic of intermediate size features, a histogram of intermediate size features. In this non-limiting example, the feature, D, Diameter is used. However, any size feature that can be extracted from the segmented image can be used. Note that the present invention extracts the size feature only from the boundary of segmented object image (s) 130. The size feature histogrammed also can be derived from other information about the segmented object.

The intermediate size features are determined from the boundary of segmented object image(s) 130 as described in FIGS. 7, 8, 9, and 10. Prior art techniques are then used to develop 1040 the histogram 1050 of the size feature, for example Diameter D.

A histogram array of M intervals (bins) is first initialized to zero. Then, size features Diameter are determined as described in FIGS. 9 and 10a–10c. Each determined Diameter value is quantized so that it will fall into one of the M bins, say Bin(x), of the histogram. The content of Bin(x) is then incremented by one, i.e., New Bin(x)=Old Bin(x)+1.

Optionally, Bin(x) is not incremented by 1 but by some integer value Q which is representative of the quality of the determined Diameter value. Following FIGS. 9 and 10, for each pixel of the segmented object image, four diameters (or other intermediate size measures), D1, D2, D3, and D4 are obtained. In a preferred weighted histogram incrementing, a diameter Di at a pixel is weighted by the factor $Q=2^n$ where n is the number other estimates of Dj, j=1, 2, 3, 4, j≠i, that are in agreement with Di at this pixel, that is, Di−e<Dj<Di+ e. For example, if D1 is computed and D2 and D4 are in agreement, bin (D1) of histogram is incremented by 4. This weighing method is intended for objects 131 that are known to be fairly close to round. For general shaped objects, weighing will just emphasize the rounded portions of, e.g., elongated shapes like cucumbers and is not preferred.

The Diameter histogram 1050 is a representation of how the radius of curvature is distributed over the segmented object(s) 130 boundaries. In other words, the content of each bin describes how many times diameter represented by that bin is determined. For the weighted incrementing, next to how many times a diameter is computed, high values of histogram bins also represent intermediate diameters that have many other intermediate diameters in common.

Histogramming 1040 is a preferred way of size characterization 240 of segmented object image(s) 130. However, other methods of characterizing size feature(s) can be used. For example, median feature value, first order (mean or average value) and/or higher order statistics of computed feature values, or any (robust) statistic that can be derived from the computed set of feature values (like the intermediate size measurements) can be used. Given this disclosure, one skilled in the art could develop other equivalent ways to characterize features. Count normalization of size histograms may not be necessary for other characterizations of intermediate size measures.

Figure 12:
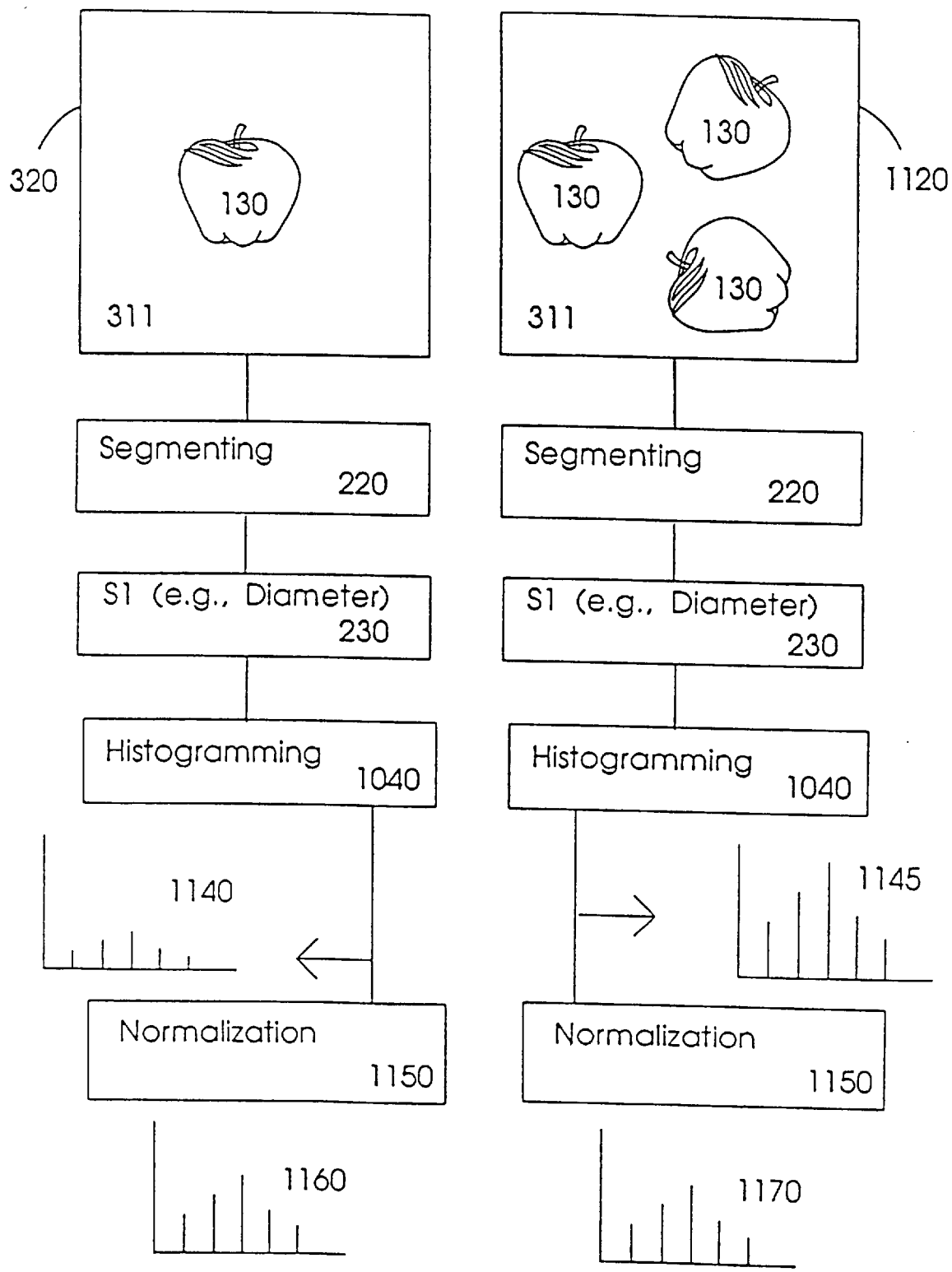
FIG. 12 is a flow chart showing a preferred method for normalization of object size feature characterization.

FIG. 12 is a flow chart showing the steps of normalizing a size histogram and how these normalized size histograms are unaffected by the number of the object(s) 131 imaged.

Image 320 is a segmented image exhibiting one segmented object 131 image 130. Image 1120 is a segmented image of three instances of object 131, exhibiting three segmented object images 130. One or more size feature(s) S1 are determined as described in FIGS. 7–10, and two size histograms are developed, size histogram 1140 and size histogram 1145, respectively. In step 1150, each histogram (1140, 1145) is normalized using the same method of normalization 1150. The normalization is with respect to the number of intermediate size features that are computed; if weighted incrementing is used, normalization is with respect to the number of computed intermediate size features times the quality factor Q for each individual intermediate size feature. If the restriction a+b<2c is not enforced, it should be noted that normalization factor is proportional to the area of the segmented object image(s) for the case of regular bin incrementing.

The resulting count normalized histograms (1170 and 1160 respectively) are identical. This result occurs even though the image 1120 with a larger number of objects 131 will contribute a higher count to each bin of the histogram 1145 than the image 320 with a fewer number of objects 131 will contribute to its respective histogram 1140.

Normalization can be done with respect to any property that can be extracted from segmented object image 130. Segment area and (boundary length)$^2$ are examples. Other measures that describe the shape can be used, such measures include but are not limited to, second and high-order (shape) moments, the size of bounding rectangle, and the area of the convex hull of object image 130.

The normalization step 250 of the algorithm 200 is a step for making the characterized size feature(s) of an object independent of the number of the actual object 131 being imaged. This step also enables one or multiple instances object size 131 to be recognized as the same object by the apparatus 100 independent of the number of objects 131, or area of objects 131, in the scene. Normalization 250 is performed on one or more of the computed feature characterization(s).

Other methods of normalization, e.g., normalizing with respect to any other characteristic derived from segmented object image, are also within the contemplation of the invention.

Figure 13:
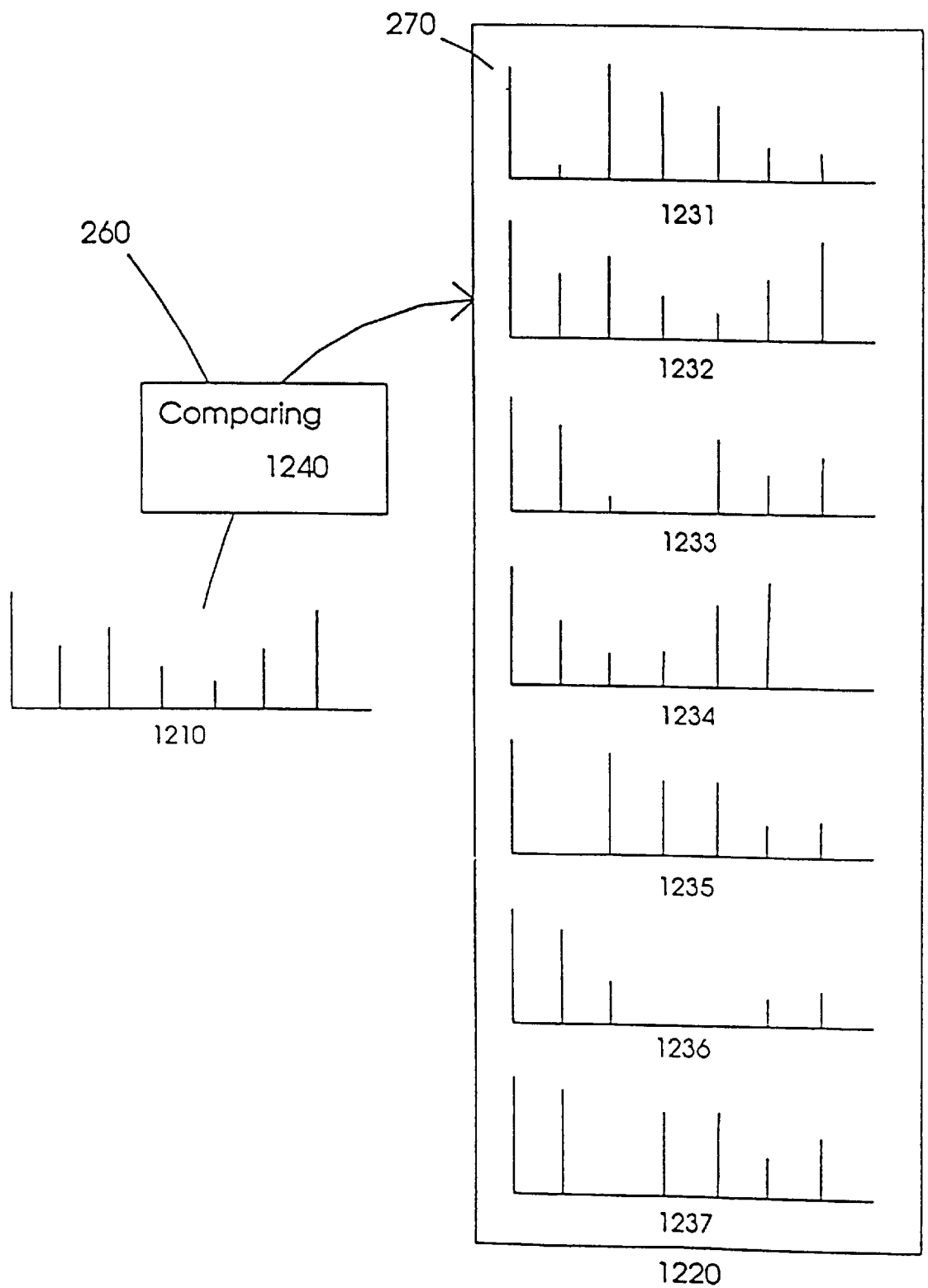
FIG. 13 illustrates the comparison of a normalized target object size characterization to one or more normalized reference object size characterizations.

FIG. 13 illustrates step 260 of the algorithm 200, normalized size characteristics of the target object 131 are compared 260 to one or more normalized reference object size characteristics. This comparison 260 depends very much on the method for characterizing object size features. One preferred comparison 260 is done with count normalized histograms.

One or more reference object size characteristics are stored 270 on a memory storage device. This device can be located in memory on the computer 140 or a separate secondary storage device 144. A preferred method for storing 270 the reference object size characteristics is to use a series of count normalized size feature histograms that characterize object size. Each of these series of count normalized size histograms has associated with it a unique object size identifier. A preferred method of storing the count normalized size feature histograms is by using a vector of normalized size feature histograms. That is, the normalized frequencies of occurrence of the different feature size values.

Step 260 of algorithm 200 in FIG. 13 compares 1240 the normalized size characterizations (1160, 1170) of the segmented target image 130 to one or more stored normalized reference size characterizations 270. Size characterization 1210 represents normalized size characterization of some segmented image containing target object(s). This size characterization is obtained as described in FIGS. 7–10. Block 1220 is a list (database) of normalized reference size characterization obtained as described, e.g., in FIG. 12. These are representations of the object sizes that the system is to be able to recognize. Each of the plurality of normalized size characterization representations are labeled typically as 1231, . . . , 1237. Only six are shown, but the number of normalized size histogram representations can be very large, e.g., in the 100s or even 1000s. Each object size to be recognized should be represented by at least one normalized size characterization but can be represented by more than one normalized size characterization. Each normalized size characterization in 1220 has associated with it a descriptive identifier of the object size that the normalized size characterization is developed from. Size characterization 1210 and reference size characterizations 1220 are not limited to one size characterization, representation can be multiple size characterizations. In that case, multiple size characterizations are developed from the image of the target object while multiple size characterizations represent each reference object size. Again, each such collection of size characterizations is associated with a unique object size identifier.

Block 1240 shows the comparison/matching of the target size characterization to the reference size characterizations. A preferred means of matching/comparing size characterizations is to determine a distance measure, L1, between target size histogram and reference size histograms. For example, let target size histogram 1210 be represented as a vector T of numbers and reference size histograms 1220 as vectors R1 through some RN. For this disclosure, the best match of the target size histogram T is defined as that reference size histogram R1 for which the L1 distance (sometimes called Manhattan distance) between T and R1 . . . R1 . . . RN is smallest. That is, RI would give the smallest L1 distance of distances.

$$Dist(T-RJ), J-1, 2, \ldots, N$$

Matching algorithms like this are well known as nearest neighbor classification. Any measure of distance that exhibits the usual properties of a distance measure (prior art) can be used here. Further, other measures that do not exhibit properties of distance, e.g., Histogram Intersection, could be used. Weights can be associated with the components of target size histogram T and reference size histograms R1 . . . RN, resulting in a component-wise weighted distance measure.

If target object size and reference object sizes are represented by multiple size histograms, preferred representations can be viewed as higher dimensional vectors containing multiple concatenated size histograms, T' and R1' . . . RN'. One preferred way to define the best match of such a concatenated target size histogram to T' is defined as that concatenated reference size histogram R1' for which the L1 distance between T' and R1' . . . RN' is smallest. (This is mathematically same as for using one size measurement histogram.) Here, different weights may be assigned to different subvectors, representing different size histograms, in the L1 distance. Again, any distance measure can be used, and also measures that do not exhibit properties of distance, e.g., Histogram Intersection, can be applied. Weights can be associated with every with the components of target histogram T' and reference histograms R1' . . . RN', resulting in a component-wise weighted distance measure.

Figure 14:
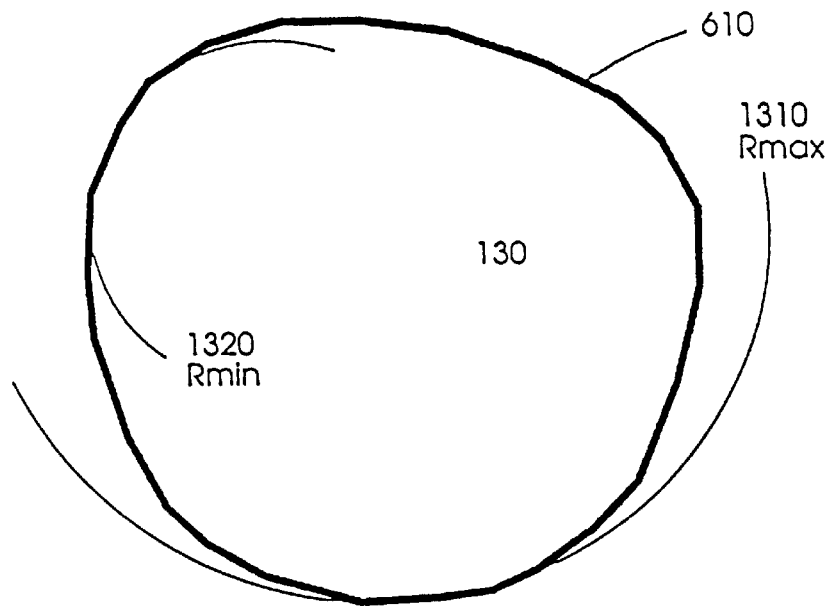
FIG. 14 is drawing of one particular object type of interest in this invention.

FIG. 14 shows a preferred type of shape identified by this invention. The round objects of interest 131 have a boundary whose radius of curvature varies over the surface. The radius of curvature, however, is bounded from above by Rmax (1310) and bounded from below by Rmin (1320). This means that the locally best fitting sphere to the object boundary has a radius R which satisfies $Rmin \leq R \leq Rmax$. Consequently, under the orthographic projection model for image formation, the locally best fitting circle to the object image boundary 610 has radius R satisfying $Rmin \leq R \leq Rmax$.

The present invention can also be applied to differently shaped objects, for example, elongated shapes. Count normalized size feature histogram then still contain information about object size. Interpretation of normalized histograms then is not as straightforward as for circular or spherical objects 131. That is, for most shapes that are not round (e.g., cucumbers), a human being cannot easily see from the normalized size histogram(s) what the corresponding shape is.

FIG. 15 is a block diagram showing the computer 140 connected to a weighing device 170 that determines the weight of the object(s) 131. Weight in conjunction with size (volume) can be used to determine the Count of objects 131 as follows. Device 170 reports the weight of object(s) 131 to computing device 140. From the diameter D of object 131, its Volume V is determined as $V=\pi D^3/6$. Volume gives unit weight, U, weight per item 131. (This may be based on the weight of water—0.58 ounces/cubic inch. Fruits weigh a fraction F of this, typically F=0.70.) Count is then determined as Count=Weight(Object(s) 130)/U Alternatively, unit weight of each particular size of produce variety (which is known after produce size determination) can be stored in computer memory 144 of computer device 140 and used directly.

Figure 16:
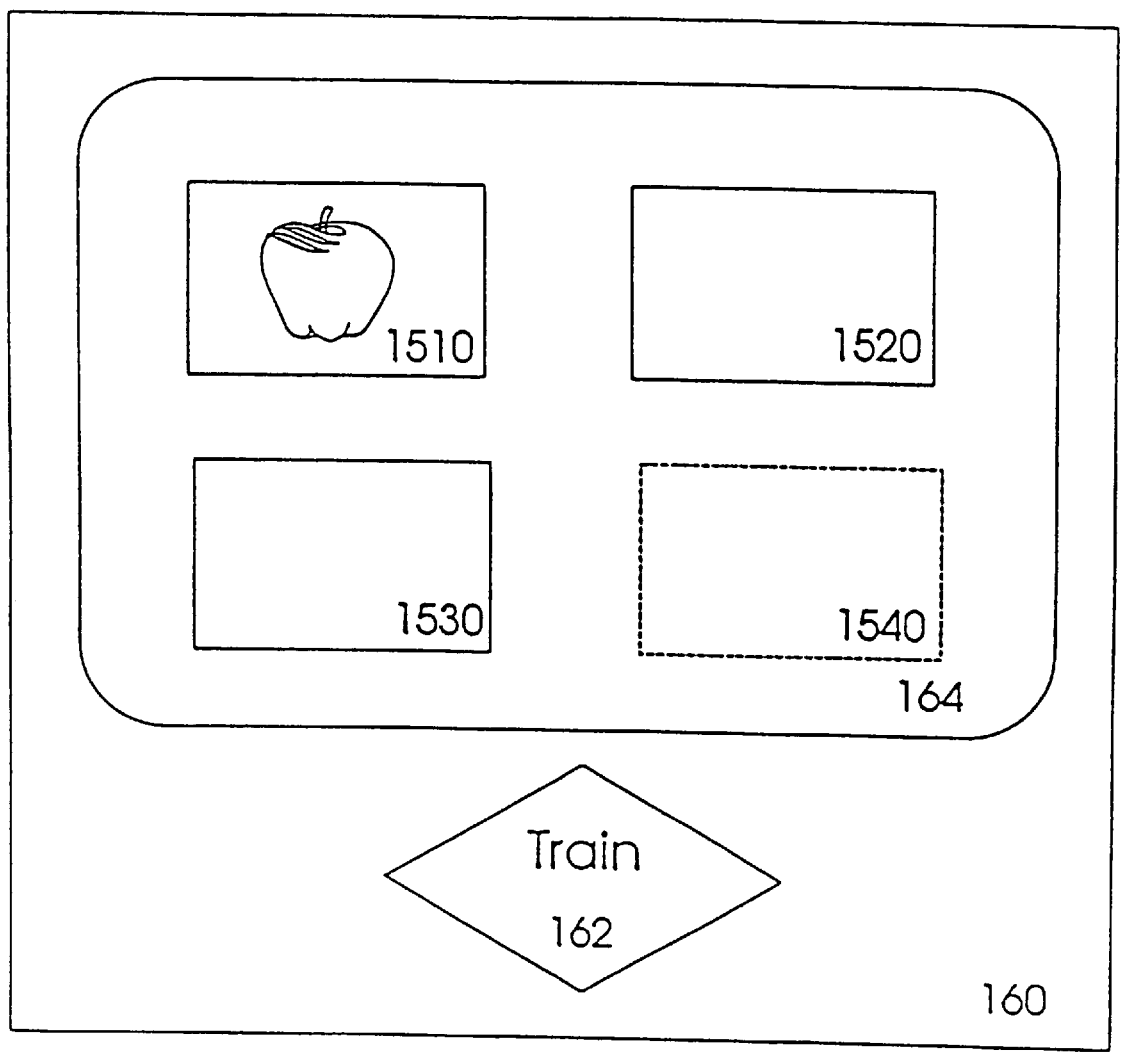
FIG. 16 shows a user interface attached to the present apparatus which presents an ordered ranking of the most likely sizes of produce being imaged.
Figure 17:
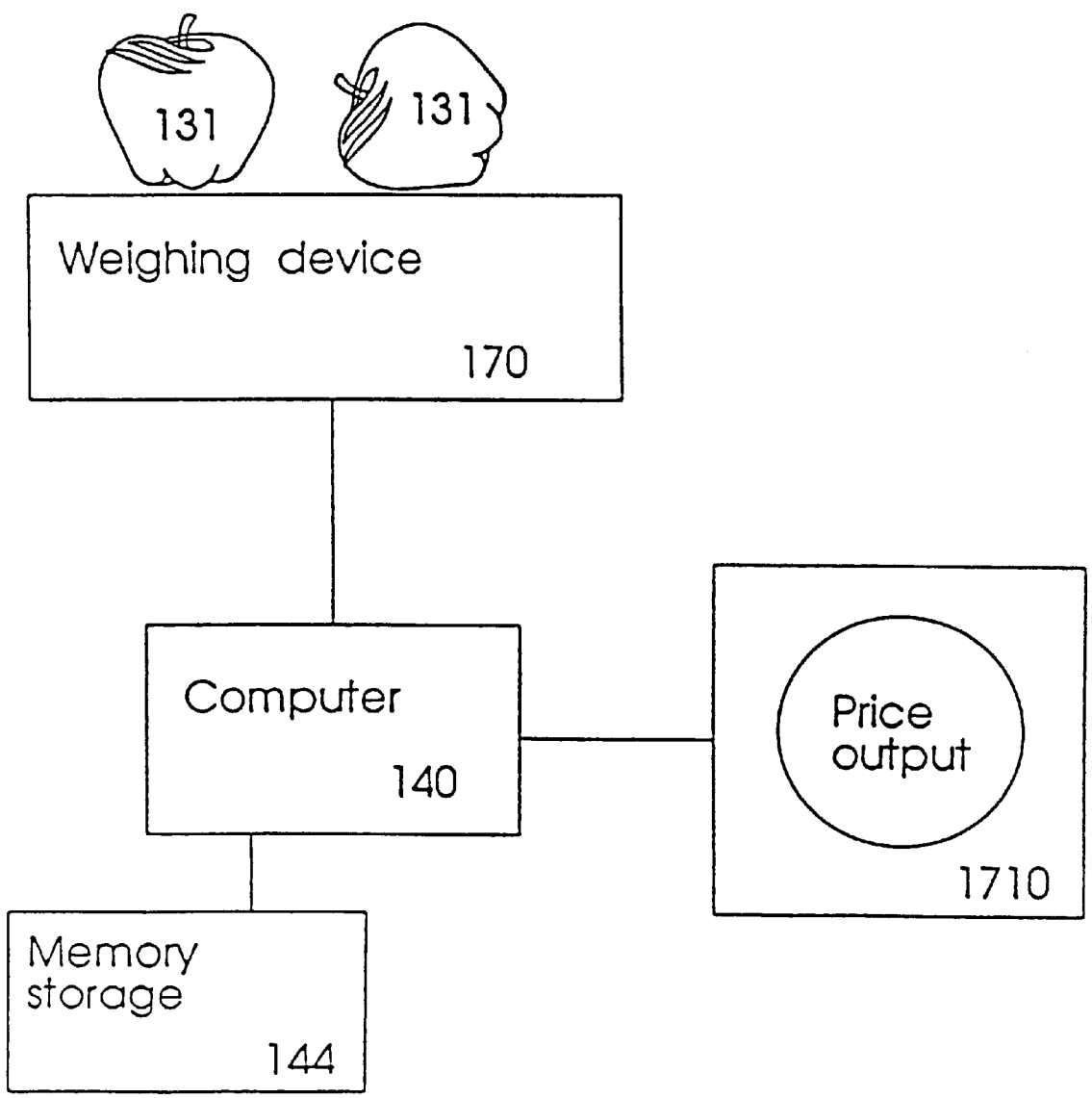
FIG. 17 is a block diagram of a system used to implement a preferred embodiment of the present invention which uses object weight to price object(s).

FIG. 16 shows an optional human interface 160. It comprises a preferred means 164 of displaying pictorial (or otherwise explained) description(s) 1510, 1520, 1530 and 1540 of various possible sizes (identities) of object(s) 131 that are determined by apparatus 100. In most cases, object(s) 131 size can be uniquely identified by comparison 260 to the reference database 270. However, in some case, there may be a match to more than one reference histogram, i.e., the target object normalized size histogram may be approximately the same as more than one reference size histogram. In these cases a human can be novelly asked through the interface 160 to make the final size recognition decision. A preferred embodiment of the interface 160 offers four or fewer choices—1510, 1520, 1530, 1540. More choices can be optionally requested by user. The human can communicate the decision to computer 140 through any means, touch, voice, mouse, keyboard.

Another novel feature of the present invention enables the system 100 to be trained. A means (button) 162 enables the user to determine when and if a count normalized histogram should be added to the reference database 1220 in storage 270, i.e., if the system is to be trained with that data to recognize (or better recognize) instances of object size 131 when presented to system 100 at some future time. If a normalized size characterization of an object 131 is not recognized, i.e., not matched with reference size information (step 260), the normalized size characterization is checked 251 if it satisfies some storage criteria 255. If the normalized size characterization of the unrecognized object size meets the storage criteria 255, it will be stored 270 along with the other reference information. Therefore, the next time this object 131 is imaged by the system 100, it will be matched to a reference image and object size recognized. Training allows the system 100 to be able to recognize the size of objects that the system is not "hard-wired" (pre-programmed) to recognize, thus making the system more flexible. The stored size characterization is count normalized so that the number of objects 131 used for reference size characterization can be different from number of objects 131 used for developing target size characterization.

Examples of preferred embodiments for automatic (without human intervention) training the system 100 are given in U.S. patent application Ser. No. 08/394,525 entitled Learning System With Prototype Replacement to Connell et al. filed on the same day as this application and that is herein incorporated by reference in its entirety.

Storage criteria can include any criteria established by the system 100 design. The ability to select and/or create storage criteria 255 can also be given to a user through the interface 160 of FIG. 16. A simple storage criteria might be to store any information provided about an unrecognized object size in the reference database 270. Other storage criteria might include, but are not limited to: (1) the quality of image 210 is good; (2) a large percentage of target object occupies image 210; (3) characterizations should be sufficiently close (in the sense of 1240 described in FIG. 13) to reference of target object in database.

FIG. 17 is a block diagram showing optional apparatus, used with system 100 to price objects. A weighing device 170 is used to determine the weight of object(s) 131. The apparatus 100 recognizes the object as described above. Once the object is recognized, a price of the object is determined. The weight 170 and or the count (number of items present, as discussed in FIG. 15) of the object is used if required in the pricing. The prices of the objects are stored in memory 144.

Price device 1610 is attached to apparatus 100 to communicate the price to the user. Price device 1610 can be a printing device, display device, or any other means of communicating the price of the object. The price can also be displayed on the interactive output device 160.

If price is specified by pound, the computer 140 calculates price as

Price=Weight×(Price of object 131 per pound)

If price is specified by count, computer 140 calculates price as

Price=Count×(Unit price of object 131)

Item count can either be obtained through human intervention or can be estimated as described in FIG. 14.

For entering count through human intervention, system 100 will supply prompt human to enter count if item 131 is indicated in computer memory 140 as being sold be count (e.g., lemons, limes).

One skilled in the art given this disclosure could develop embodiments equivalent to the present invention that are within the contemplation of the inventors.

We claim:

1. A method for characterizing size features of a commodity, said method comprising the steps of:

scanning at least one target object illuminated with a light of a first brightness to acquire a first image and scanning said at least one target object illuminated with a light of a second brightness different from said first brightness to acquire a second image, said target objects being produce of a same variety or type and at a same position when said first and second images are acquired, wherein a visual input device is used for receiving a scanned scene image, the scene image including the image of the at least one target object and a background image;

scanning at least one target object taking a first digitized image of the at least one target object illuminated at a higher level and taking a second digitized image of the at least one target object illuminated at a lower level;

identifying visual characteristics by segmenting the at least one target object from the background image using a processed scene image generated from a combination of the first and second digitized images;

identifying visual characteristics associated with said first and second images of the at least one target object in the scene image;

segmenting the at least one target image from the background image by comparing said first and second images; and processing the segmented target image and classifying said at least one target object, by size, using the identified visual characteristics.

2. A method as recited in claim 1, wherein the step of segmenting includes separating an opaque part of the target image from a translucent part of the target image.

3. A method as recited in claim 1, further comprising the step of sorting target objects by the classes identified in the classifying step.

4. A method as recited in claim 1, further comprising the step of weighing the at least one target object and wherein the step of classifying uses weight information in addition to the visual characteristics to classify the at least one target object.

5. A method as recited in claim 4, further comprising the step of sorting target objects by the classes identified in the classifying step.

* * * * *